(12) United States Patent
Sela et al.

(10) Patent No.: US 10,807,802 B1
(45) Date of Patent: Oct. 20, 2020

(54) CONVEYOR BELT FASTENER SYSTEM AND METHOD

(71) Applicant: Volta Belting Technology Ltd., Karmiel (IL)

(72) Inventors: Omri Sela, Haifa (IL); Alexander Davidovich, Karmiel (IL); Lior Eitan Shalel, Karmiel (IL); Benjamin Longman, Karmiel (IL)

( * ) Notice: Subject to any disclaimer, the term of this patent is extended or adjusted under 35 U.S.C. 154(b) by 0 days.

(21) Appl. No.: 16/601,600

(22) Filed: Oct. 15, 2019

(51) Int. Cl.
*B65G 15/30* (2006.01)

(52) U.S. Cl.
CPC .... *B65G 15/30* (2013.01); *B65G 2812/02217* (2013.01)

(58) Field of Classification Search
None
See application file for complete search history.

(56) References Cited

U.S. PATENT DOCUMENTS

| 5,632,701 | A | 5/1997 | David |
| 5,890,266 | A | 4/1999 | Herold |
| 8,695,790 | B2 * | 4/2014 | Ridgell ..................... F16G 3/02 198/844.2 |
| 8,925,716 | B2 * | 1/2015 | Boucher .................... F16G 3/04 198/844.2 |
| 8,985,312 | B2 * | 3/2015 | Osborn .................... G09F 19/22 198/502.1 |
| 9,371,887 | B2 | 6/2016 | Frey |
| 10,155,342 | B2 | 12/2018 | Manninen |
| 2009/0301845 | A1 | 12/2009 | Degroot et al. |

FOREIGN PATENT DOCUMENTS

| DE | 10029571 | 1/2002 |
| EP | 2116487 | 11/2009 |
| EP | 2801268 | 11/2014 |
| EP | 3115640 | 1/2017 |
| JP | 2000044026 | 2/2006 |

\* cited by examiner

*Primary Examiner* — Kavel Singh
(74) *Attorney, Agent, or Firm* — Haim M. Factor—1st-Tech-Ideas

(57) ABSTRACT

A conveyor belt fastening system for an endless belt formed by joining a first and a second end of a conveyor belt together, the system comprising: a lace connected to the first and second ends of the conveyor belt, the endless belt having an exterior and an interior surface; at least one drive sprocket and at least one return roller about which the interior surface of the endless belt is peripherally wrapped, the at least one drive sprocket configured to translate the endless belt; wherein the lace has a symmetric configuration about a longitudinal axis of symmetry, the longitudinal axis aligned longitudinally and parallel to the endless belt, between the exterior and interior surfaces of the endless belt.

16 Claims, 18 Drawing Sheets

Prior Art
Detail A

Detail A

Detail B

CONVEYOR BELT FASTENER SYSTEM AND METHOD

BACKGROUND and PRIOR ART

The current invention relates to power-driven conveyor belts, and more particularly to a system and method for connecting ends of a conveyor belt to form an endless conveyor belt.

In the specification and claims which follow hereinbelow, the term "endless belt" is intended to mean a directly driven, flexible conveyor belt, typically used in facilities where hygiene and/or cleanliness are important. An example of facilities using an endless belt include food processing plants for human consumption, inter alia. Endless belts used in such facilities having conveyors are typically made of materials that can be thoroughly cleaned, such as plastics or stainless steel. In the specification and claims which follows, the term "conveyor belt" is intended to have the same meaning as "endless belt". More specifically, an endless belt is made of a resilient material, such as a plastic polymer, an elastomer, or a rubber, with the belt being flexible along its length. A conveyor belt may additionally be reinforced and/or otherwise strengthened to include structures/materials such as but not limited to: reinforcement wire; reinforcement cloth; and additional layers of belt materials.

A typical configuration of endless belts has them wrapped around a sprocket drive wheel (typically simply called a "sprocket") and around a return roller, or shoe or drum, in the return path—as known in the art. In some endless belt configurations, there are two sprockets. In many belt configurations, the belt has teeth configured on the surface of the belt contacting the sprocket and the sprocket drive wheel has corresponding teeth which serve to drive the belt, not unlike a typical bicycle sprocket driving a chain. In some endless belt configurations, the belt does not have teeth and the sprocket and return roller serve to drive the belt directly by friction. Endless belt configurations and systems are discussed in further detail hereinbelow.

The endless belt is typically formed by joining two ends of a conveyor belt segment together at a seam. Methods of joining two ends of the belts together known in the art include: splicing (utilizing splicing presses or butt welding tools to connect the ends of the conveyor belt sections together); and/or mechanical means—such as a hinge-pin system and/or a knuckled connector system described in US Patent Application Publication Number 2009/0301845, by Degroot et al., the contents of which are incorporated herein by reference.

As part of typical maintenance, cleaning, and/or repair procedures, the endless belt may have to be opened and/or removed from the sprockets and/or other parts of a conveyor system. Removing endless belts poses an inconvenience, normally requiring disassembly of parts of the conveyor system, moving/repositioning of the sprockets, and possible damage of the belt (perhaps cutting the belt for it to be re-seamed later). The prior art addresses this consideration with mechanical means to join-detach- and rejoin conveyor belt ends together. In most cases, the prior art proposes a mechanical means, which is also called a "fastener" and/or a "lace" hereinbelow) which is mechanically connected to the ends of the belt (either by being formed into a belt segment or by connecting means such as, but not limited to, butt welding) with the fastener/lace subsequently opened/disconnected and closed/reconnected to remove and reposition the belt, respectively.

Reference is currently made to FIGS. 1A and 1B, which are pictorial schematic representations of a prior art endless belt system 2 and a detailed pictorial representation of part of the system, respectively—as described hereinabove. Prior art endless belt system 2 includes: an endless belt 3 having an exterior surface 3a (illustrated as a conveying surface for conveying a product) and an interior surface 3b, which typically serves as a drive surface including drive elements, illustrated as teeth 5, extending from interior surface 3b, the teeth having a "V" shaped profile. Teeth 5 are spaced longitudinally on the interior surface 3a by a distance "p", defined as a "tooth pitch", or simply "pitch"—as indicated by the letter "p". The belt has a fastener 6 (also called "a lace") which, as described hereinabove, serves to join-detach- and rejoin belt ends together. Lace 6 is formed at ends of the belt. Endless belt 3 may be formed by a number of belt segments sequentially joined together, for example at seam 7 (which may be a butt weld, inter alia, as known in the art) or in a single belt segment having ends joined together by lace 6.

A sprocket drive wheel 8 (also called simply "sprocket") is shown, with endless belt 3 wrapped around sprocket 8, the sprocket having an axle fixed to a conveyor system frame (neither shown in the figure) and the sprocket serving to engage and drive teeth 5, thereby translating endless belt 3, as known in the art. A return roller 9 (also referred to as "shoe" or "drum") is shown in the return path of endless belt 3. Return roller 9 shown in the figure has means to engage drive teeth 5, however other configurations of return roller 9 known in the art do not engage teeth 5 and return roller typically serves mainly to provide tension for endless belt 3.

Referring to FIG. 1B, sprocket 8 has alternating teeth drive depressions 11 and concave-shaped spacers 13 arranged on the circumference of the sprocket, as shown in the figure, the drive depressions and concave-shaped spacers having a spacing corresponding to "p" pitch of the belt. The sprocket of the prior art endless belt system is called a "female sprocket"—as opposed to a "male sprocket"—in that the teeth drive depressions of the prior art female sprocket serve to receive the extended "V" shaped belt teeth of the belt. Concave-shaped spacers 13 in the female sprocket are configured to receive fastener 6 so that the fastener does not interfere with movement of the belt as the belt wraps and is translated around the female sprocket. As such, the female sprocket shown in the figure is part of a dedicated and limiting belt-and-sprocket configuration.

The following are prior art related to the abovementioned fasteners and associated considerations/problems.

In European Patent Application no. EP2116487, whose disclosure is incorporated by reference, Fandella et al. describe a device a modular conveyor belt comprising several rigid modules with a load side comprising a load surface and with a drive side comprising drive surfaces for a sprocket wheel. Connection parts connect the modules to adjacent modules. The connection parts comprise a flexible joining member and have a load surface joining the load surfaces of the modules. The modular conveyor belt does not have spaces or gaps between the modules and joining members and this prevents the accumulation of undesirable debris between the modules.

In Japan Patent publication no. JP2000044026, whose disclosure is incorporated by reference, Hayashi Shuichiro describes a device directed to dispense with a special metal fitting or attachment and to facilitate the manufacture by forming couplings at both ends of a belt main body. In a conveyer belt A, couplings having a locking hole along the width direction of a belt main body are formed respectively, and locking pins are inserted to the locking holes of both couplings, in the condition to make the belt main body in a loop form, to allow both couplings to approach each other. The couplings are formed by turning over the end part of the belt main body and connecting the turned-over end part to the belt main body.

In U.S. Pat. No. 9,371,887, whose disclosure is incorporated by reference, Frey describes a splicing device for closing a looped material band comprising two splicing elements (intimately linked to the ends of the material band, assembled together by fitting two toothings [sic] into each other, and locked by a transverse locking rod inserted in the aligned transverse openings of the teeth (13) of each toothing [sic]. The splicing elements are made out of a material compatible with that of the material band and comprise a traction core extending longitudinally up to the teeth and surrounding the transverse opening of teeth of each toothing [sic] so that, when the splicing device is assembled and locked, the traction cores of the splicing elements ensure the tensile strength of the splicing device while remaining flexible.

Bachmann, in German Patent no. DE10029571, whose disclosure is incorporated by reference, describes a method for joining two belts involving injection of a liquid, subsequently hardening material around the belt ends, with use of an appropriate tool, to form elements with alternating protrusions and matching recesses. The joint is closed by means of locking bolt passing through the aligned channels in the protrusions. Also claimed is a resultant joint, and a tool used for implementation of the proposed method.

In European Patent Application no. EP2801268, whose disclosure is incorporated by reference, Rapp et al. describe a tobacco distribution device with a tobacco supply unit, with a conveyor unit, comprising a conveyor unit arranged in the conveyor belt and with a tobacco treatment unit. The invention further relates to a method for inserting a conveyor belt in a conveyor unit. Exchange of the belt is achieved in that the conveyor belt comprises two conveyor belt ends formed by a break transversely to the conveying direction and a lock for connecting the two conveyor belt ends by a form fit. In addition, task three is achieved in that a conveyor belt to be introduced is introduced with two formed by a break transversely to the conveying direction of the conveyor belt ends and with a lock for connecting the two conveyor belt ends in the conveyor unit.

Huls et al., in European Patent Application no. EP2801268, whose disclosure is incorporated by reference, describes a belt or a belt segment having a plurality of reinforcing members running parallel to one another in the longitudinal direction (X) and a connecting element having one end of the belt or of the belt segment and for connection to a further connecting element of the other end of the belt or with one end of a further belt segment is formed, wherein the ends of the strength support are held by the connecting element. The belt or the belt segment is characterized in that the ends of the reinforcement are non-positively connected to at least one clamping body, wherein the clamping body of the connecting element at least in the longitudinal direction (X) can be held positively.

Neel David, in U.S. Pat. No. 5,632,701, whose disclosure is incorporated by reference, describes an industrial belt splice assembly having two industrial belt portions each including opposite faces and an end portion formed to define a splice element. The splice elements have knuckles formed therein. The knuckles are intermeshed and have bores therein which are substantially in alignment. A hinge pin extends through the aligned bores in the knuckles and interlocks the splice elements. The splice assembly further comprises a hard splice guard mounted on each industrial belt member. The splice guard substantially covers the knuckles and protects the splice from damage.

In U.S. Pat. No. 5,890,266, whose disclosure is incorporated by reference, Herold describes a unique connecting pin is provided for splicing or lacing up conveyor belt segments. The connecting pin has multiple core pieces of defined lengths, aligned within the interior of a casing element. The casing element is constructed from a relatively soft material, which can give during operations, and the core pieces are aligned in such a way, that they extend through more than two coupling eyelets.

Manninen, in U.S. Pat. No. 10,155,342, whose disclosure is incorporated by reference, describes a seaming element for seaming industrial textiles for filtration or other uses, an industrial textile with seaming elements, and a method of seaming such textiles. The seaming element is secured to a first seamable end or edge of the fabric, and includes at least one extension member, which can be a channeled protrusion, and which is engageable with a corresponding at least one extension member of a corresponding seaming element secured to the second seamable end or edge. The seaming elements are configured and dimensioned so that when the extensions or protrusions of the two seaming elements are aligned together and engaged, in some embodiments being secured by a pintle, they have a thickness which is compatible with the caliper of the finished fabric, to form a secure seam while avoiding or minimizing any discontinuity or irregularity in the finished fabric.

In U.S. Pat. No. 8,695,790 (assigned to Laitram LLC) whose disclosure is incorporated by reference, Ridgell et al. describe a fastening system for joining two ends of a conveyor belt segment including an inhibiting surface for controlling movement of the ends relative to each other. The inhibiting surface is offset from an inner surface of a conveyor belt segment employing the fastening system and engages a surface of a corresponding conveyor belt segment to reduce tenting of the conveyor belt segment ends.

One major drawback of some of the prior art fasteners, such as described by Ridgell, is that the sprocket wheel and endless belt must specifically accommodate a "female" configuration, as described in FIGS. 1A and 1B. A "male" configuration (as described further hereinbelow) and/or alternate configuration of the belt and sprocket—as opposed to the dedicated configuration shown in FIGS. 1A and 1B—is not accommodated. In some sprocket configurations known in the art (not shown in the figures) the sprocket and belt have no teeth or have a tooth configuration different than that shown in the referenced figures. There is therefore a need to have a fastener having more universal integration with sprocket-belt configurations.

Another shortcoming of some of the prior art fasteners is a "hinging" or "tenting" effect in the region of the seam/fastener when the belt moves around the sprocket, whereby the ends of the conveyor belt may be projected away from the sprocket and/or sprocket drive teeth. Hinging/tenting can impact sprocket driving and/or cause belt wear, inter alia. In the specification and claims which follow hereinbelow, the terms "tenting" and "tenting effect" are directed to the problem described hereinabove.

Another similar but different concern with some of the prior art fasteners is that of "back-flex", whereby the fastener does not provide any/sufficient constraint to belt flexing in the direction opposite that of tenting, as described hereinabove. While back-flex may not be a problem directly related to the sprocket/sprocket wear, back-flex can lead to belt wear in that the belt, at the seam, does not exhibit a similar continuity as the rest of the endless belt. Having the fastener serve to constrain belt rotational movement about the fastener can mitigate this problem. Optionally or alternatively, when a conveyor system has one or more "snub rollers", as known in the art, prior art fasteners could undesirably flex differently in back-flex or in tenting—depending on the orientation of the fastener with regard to the sprocket and/or snub roller. In the specification and claims which follow hereinbelow, the term "back-flex" is directed to the problems described hereinabove.

In certain sprocket configurations, in addressing tenting and/or back-flex effect in endless belts having teeth integrated on the surface of the belt contacting the sprocket, inclusion of the fastener along the belt in the prior art is constrained to take into consideration the distance between belt teeth (also referred to hereinbelow as "tooth pitch" or simply "pitch") including the mechanical fastener versus the sprocket configuration and a corresponding spacing of the sprocket teeth—so as to ensure proper sprocket driving of the belt. Clearly, a fastener enabling more universal integration with various sprocket configurations is preferable.

Another consideration/shortcoming of the prior art is a fastener being applicable/integrated where there are no belt teeth and the sprocket does not drive with drive teeth. In this configuration, it is desirable for the fastener to be integrated as closely as possible with the thickness of the belt to ensure proper/optimal belt drive.

An additional shortcoming found in the prior art is that debris can be accumulated/trapped in complicated geometries of some mechanical fasteners, effectively making the fasteners a source of uncleanliness for the entire belt system.

There is therefore a need for an endless belt fastener system, allowing the fastener to be being opened/disconnected and closed/reconnected to remove and reposition the belt, as known in the art, while effectively addressing considerations/problems related to: easily attaching the fastener to the belt; various configuration of fastener and sprocket; tenting; back-flex; more universal integration with sprocket configurations—sprockets having teeth (such as, but not limited to "male sprockets") and those without; and having geometric and material construction conducive to cleanliness and ease of cleaning, among other considerations.

SUMMARY OF INVENTION

According to the teachings of the current invention, there is provided a conveyor belt fastening system for an endless belt formed by joining a first and a second end of a conveyor belt together, the system comprising: a lace connected to the first and second ends of the conveyor belt, the endless belt having an exterior and an interior surface; at least one drive sprocket and at least one return roller about which the interior surface of the endless belt is peripherally wrapped, the at least one drive sprocket configured to translate the endless belt; wherein the lace has a symmetric configuration about a longitudinal axis of symmetry, the longitudinal axis aligned longitudinally and parallel to the endless belt, between the exterior and interior surfaces of the endless belt. Preferably, the lace includes a first and a second lace element, each lace element having a plurality of alternatingly configured protruding members and receiving slots, each protruding member extending longitudinally from a spline and along the longitudinal axis of symmetry and each protruding member having a pin hole centered on the longitudinal axis and coaxially aligned with a lateral axis configured parallel to the spline. Most preferably, the first and second lace elements are interleaved, with respective alternating protruding members and receiving slots and respective pin holes in alignment, a pin inserted into aligned pin holes. Typically, the pin serves to lock the first and second elements together and to allow limited flexing of the lace about the pin. Most typically, the limited flexing serves to inhibit and prevent tenting and back-flex of the lace.

Preferably, a plurality of drive elements are configured laterally on and extending from the interior surface of the endless belt, the plurality of drive elements longitudinally spaced by a belt-pitch spacing, the lace integrated between individual drive elements by a value chosen from the list including: one-half belt pitch and one belt pitch. Most preferably, the at least one drive sprocket has protruding drive teeth configured on the circumference of the at least one drive sprocket, the drive teeth having a sprocket-pitch value no less than the belt-pitch value and the lace not interfering with drive teeth. Typically, the belt-sprocket-lace configuration is male. Most typically, the interior surface of the endless belt is smooth and not having drive elements and the drive sprocket is a pulley, the pulley having a circumference and with the lace lying substantially flat on the circumference of the pulley as the belt is translated by the pulley.

According to the teachings of the current invention, there is further provided a conveyor belt fastening system for an endless belt formed by joining a first and a second end of a conveyor belt together, the system comprising: a lace connected to the first and second ends of the conveyor belt, the endless belt having an exterior and an interior surface; at least one drive sprocket and at least one return roller about which the interior surface of the endless belt is peripherally wrapped, the at least one drive sprocket configured to translate the endless belt; wherein the lace has a symmetric configuration about a longitudinal axis of internal symmetry, the longitudinal axis aligned parallel with the exterior and interior surfaces of the endless belt, the lace having an arcuate upper surface and a flat lower surface offset from the longitudinal axis. Preferably, the lace includes a first and a second lace element, each lace element having a plurality of alternatingly configured protruding members and receiving slots, each protruding member extending longitudinally from a spline and along the longitudinal axis of internal symmetry and each protruding member having a pin hole centered on the longitudinal axis of internal symmetry and coaxially aligned with a lateral axis configured parallel to the spline. Most preferably, the first and second lace elements are interleaved, with respective alternating protruding members and receiving slots and respective pin holes in alignment, a pin inserted into aligned pin holes. Typically, the pin serves to lock the first and second elements together and to allow limited flexing of the lace about the pin.

According to the teachings of the current invention, there is further provided a a method of forming an endless belt by joining a first and a second end of a conveyor belt together, the method comprising the steps of: connecting a lace to the first and second ends of the conveyor belt, the endless belt having an exterior and an interior surface; peripherally wrapping the interior surface of the endless belt about at least one drive sprocket and at least one return roller, the at least one drive sprocket translating the endless belt; whereby the lace is symmetrically configured about a longitudinal axis of symmetry, the longitudinal axis aligned longitudinally and parallel to the endless belt, between the exterior and interior surfaces of the endless belt. Preferably, the lace includes a first and a second lace element, each lace element having a plurality of alternatingly configured protruding members and receiving slots, each protruding member extending longitudinally from a spline and along the longitudinal axis of symmetry and each protruding member having a pin hole centered on the longitudinal axis and coaxially aligned with a lateral axis configured parallel to the spline. Most preferably, the first and second lace elements are interleaved, with respective alternating protruding members and receiving slots and respective pin holes in alignment, a pin inserted into aligned pin holes.

LIST OF FIGURES

The invention is herein described, by way of example only, with reference to the accompanying drawings, wherein.

FIGS. 6A, 6B, 7A, 7B, and 8 are isometric views of male belt-sprocket configurations and corresponding side elevational views of belts, respectively in accordance with embodiments of the current invention.

Figure 9:
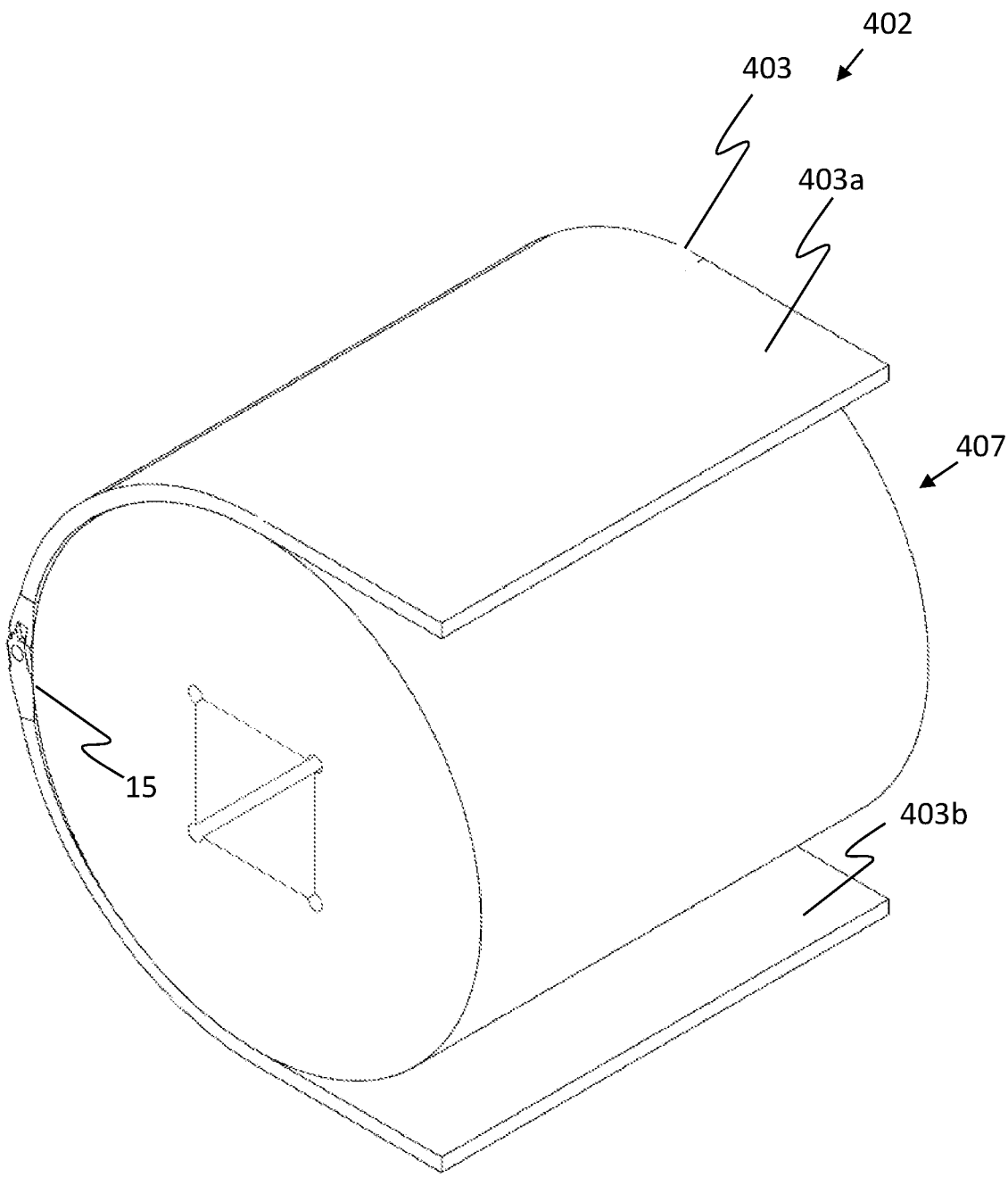
Figure 10:
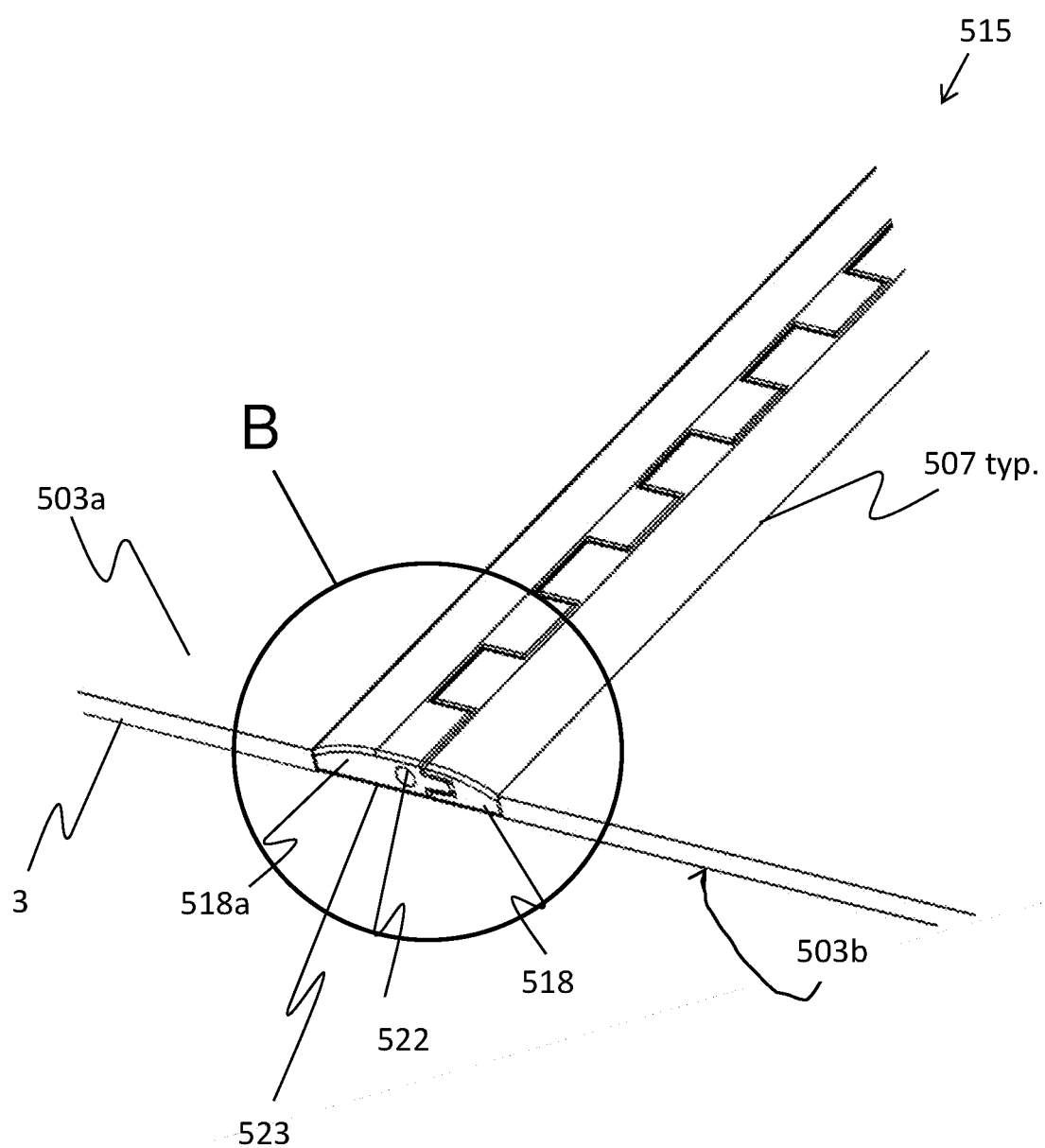
Figure 11:
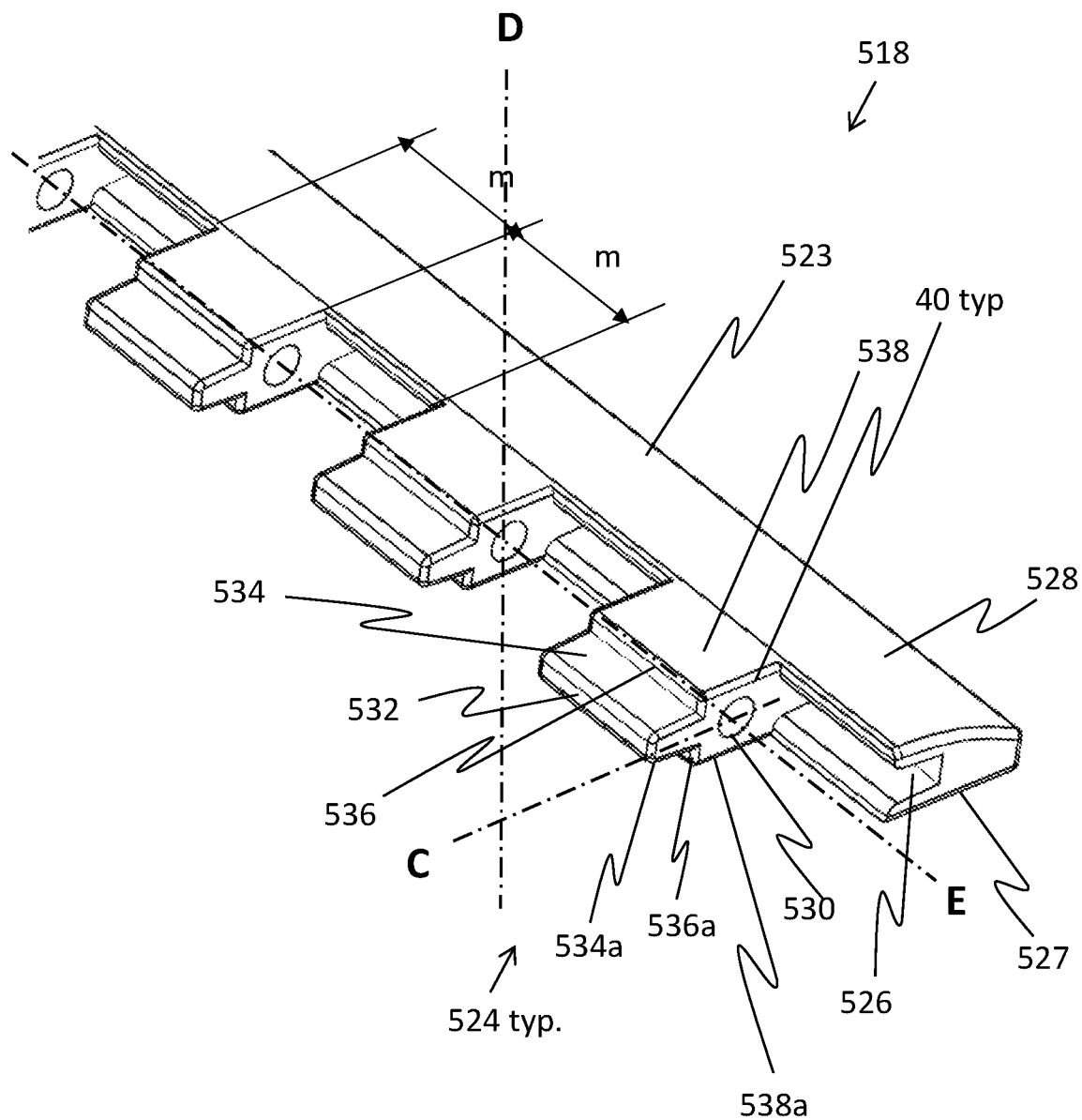
Figure 12:
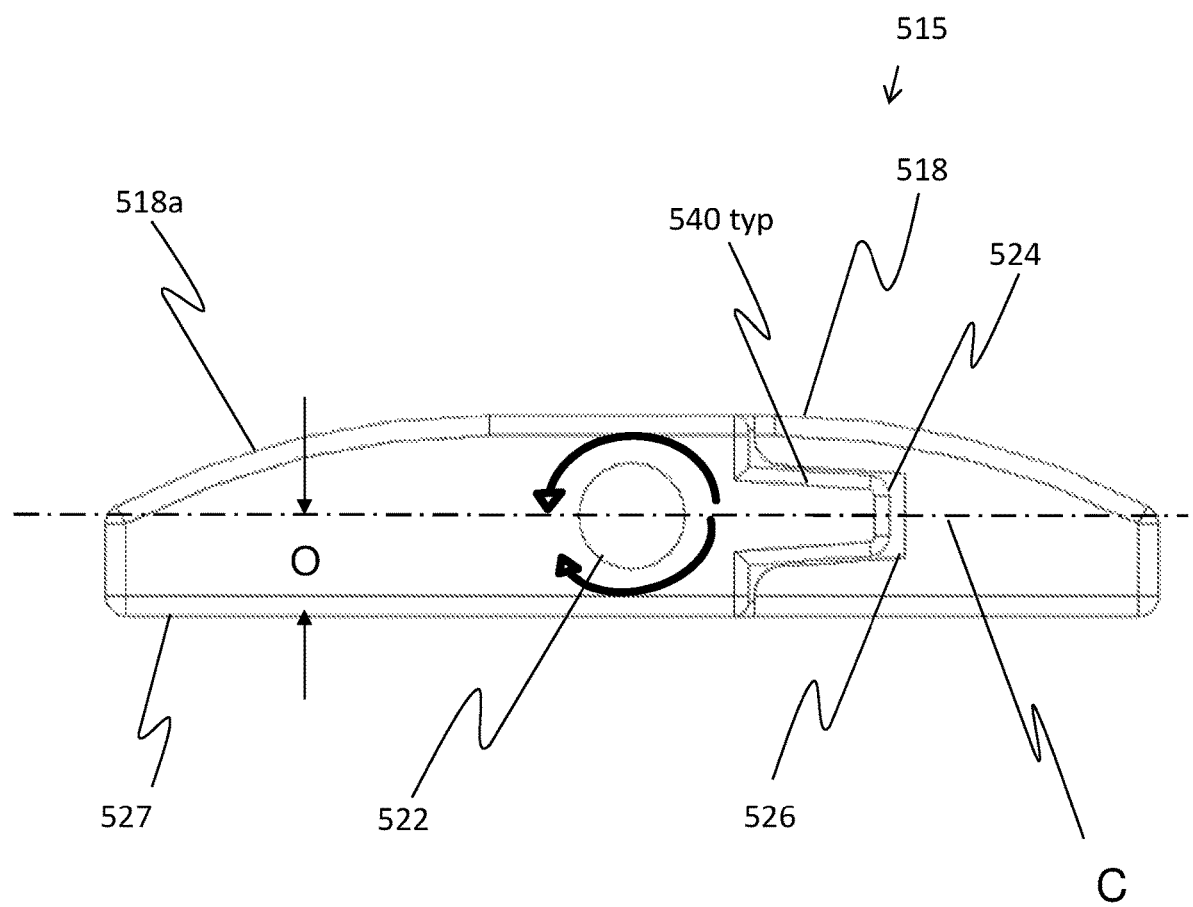
Figure 13:
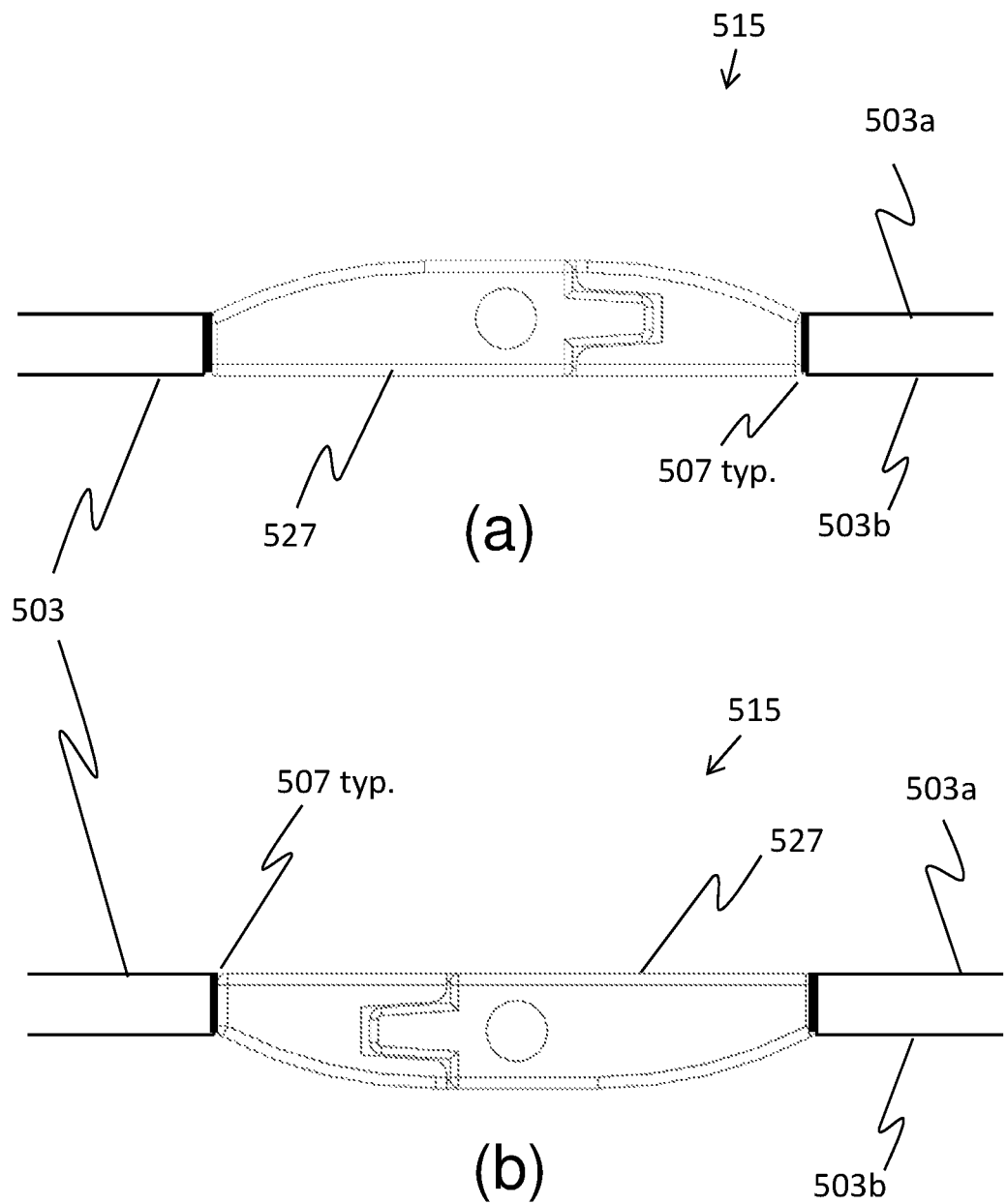
Figure 14:
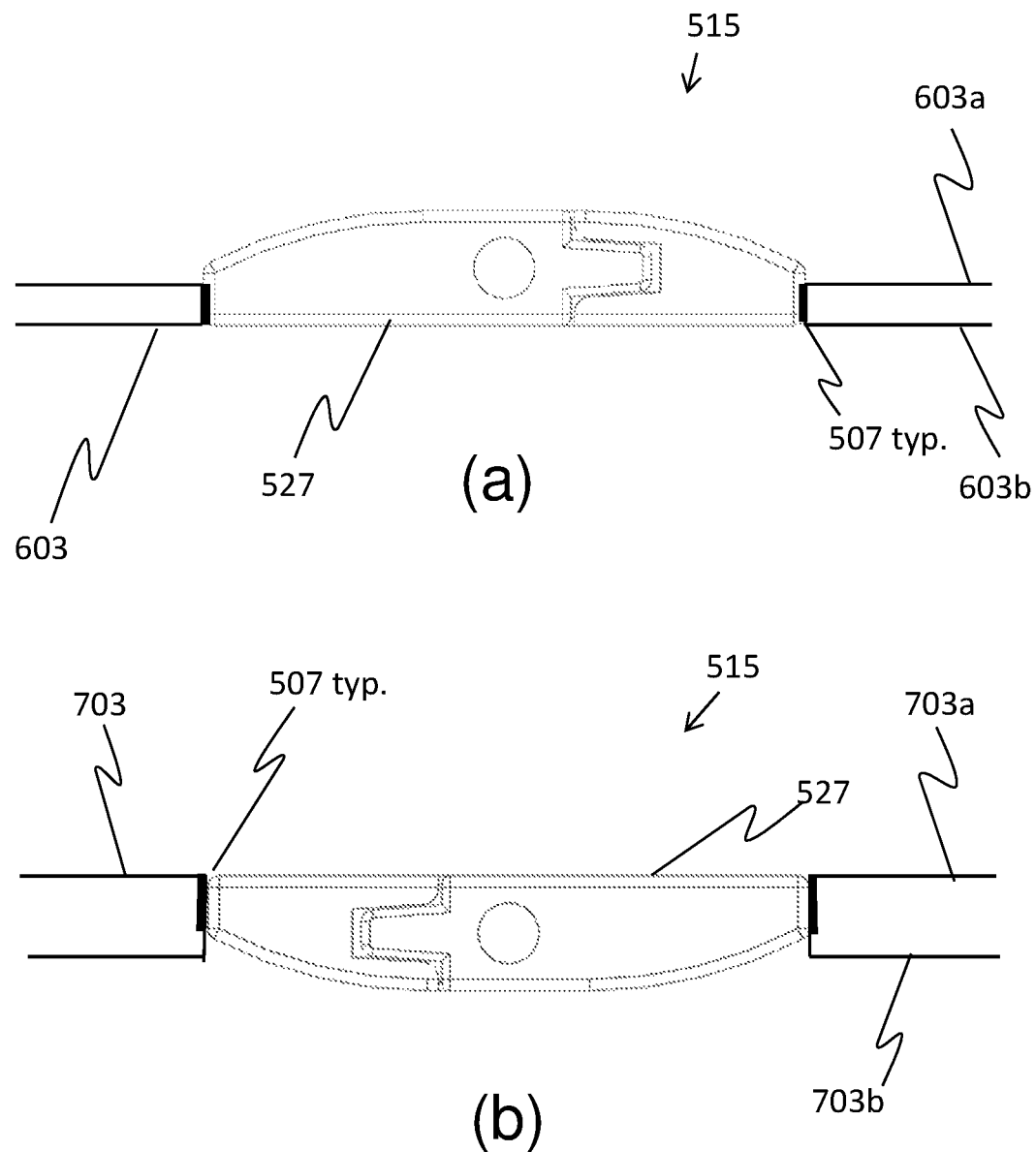
Figure 15:
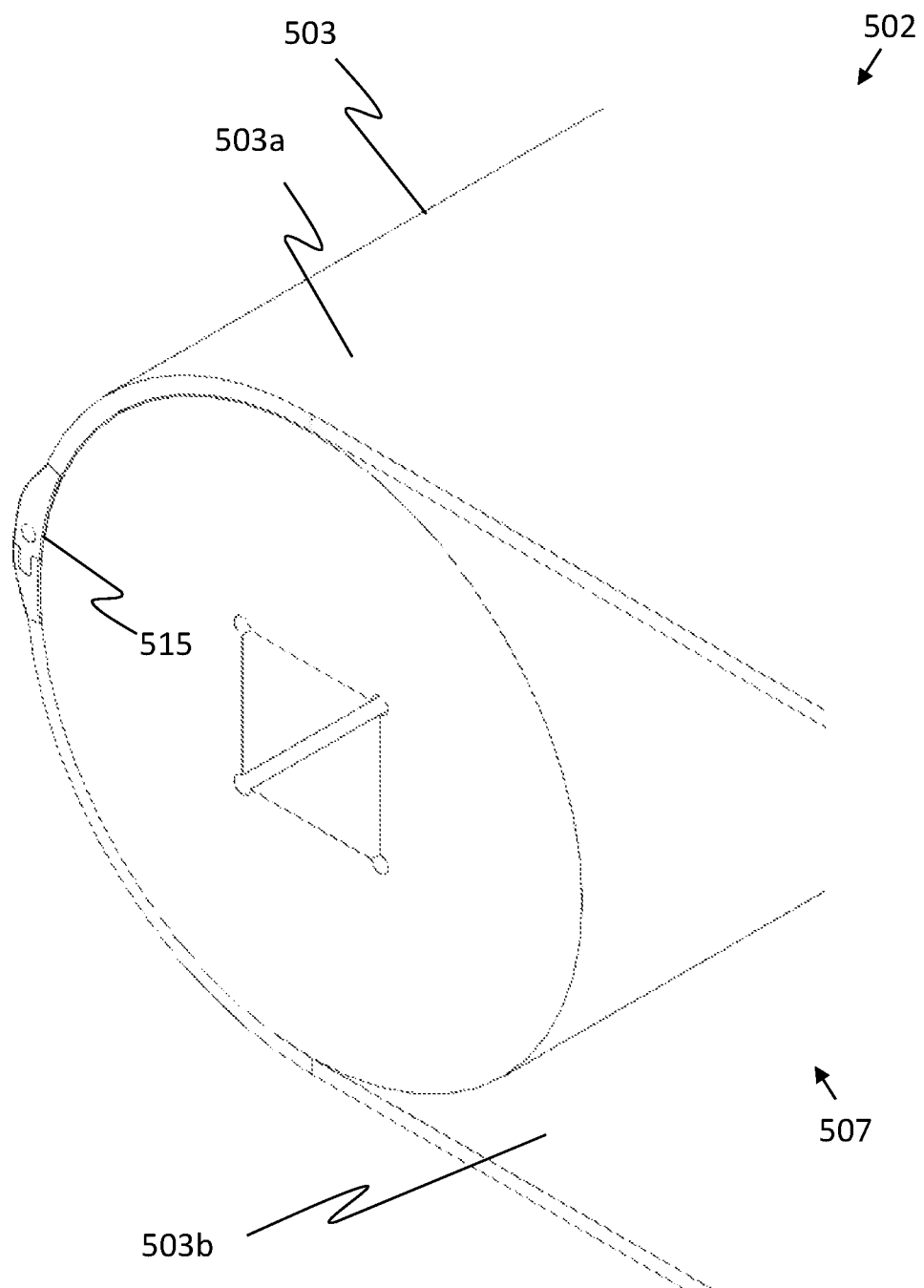

FIG. 9 is an isometric view of an endless belt system including an endless belt having an exterior surface and an interior surface not having any drive elements, in accordance with embodiments of the current invention;

FIGS. 10, 11, and 12 are an isometric view of a lace, a detailed elevation view of a lace element, and a detailed elevation view of the lace, in accordance with embodiments of the current invention;

FIGS. 13 and 14 are elevational views of the lace in various configurations with belts, in accordance with embodiments of the current invention; and FIG. 15 is an isometric view of an endless belt system including an endless belt having an exterior surface and an interior surface not having any drive elements, in accordance with embodiments of the current invention.

DETAILED DESCRIPTION

Embodiments of the current invention relate to power-driven conveyor belts, and particularly to a system and method for connecting ends of a conveyor belt body to form an endless conveyor belt.

Figure 1A:
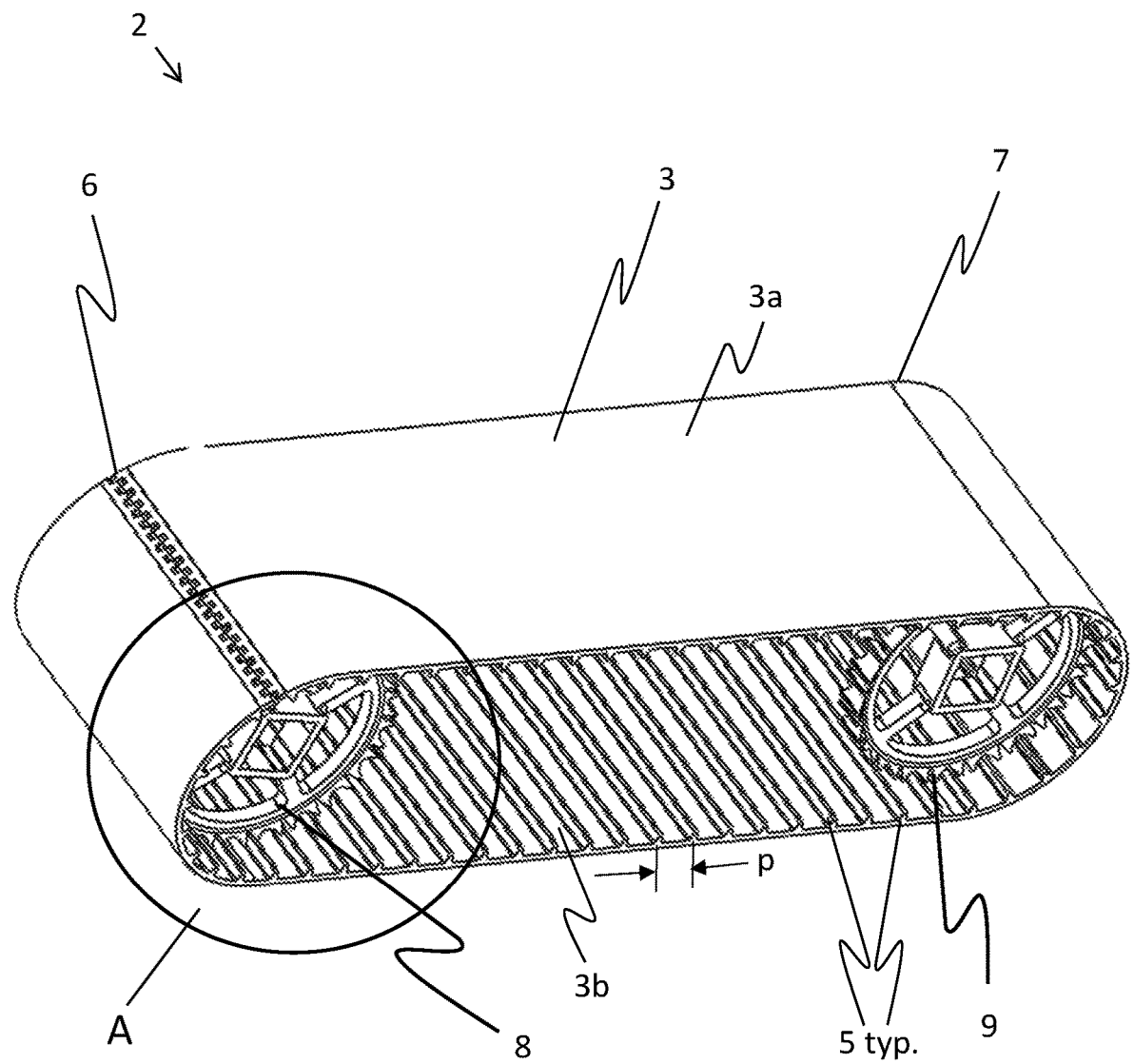
FIGS. 1A and 1B are pictorial schematic representations of a prior art endless belt system 2 and a detailed pictorial representation of part of the system.
Figure 1B:
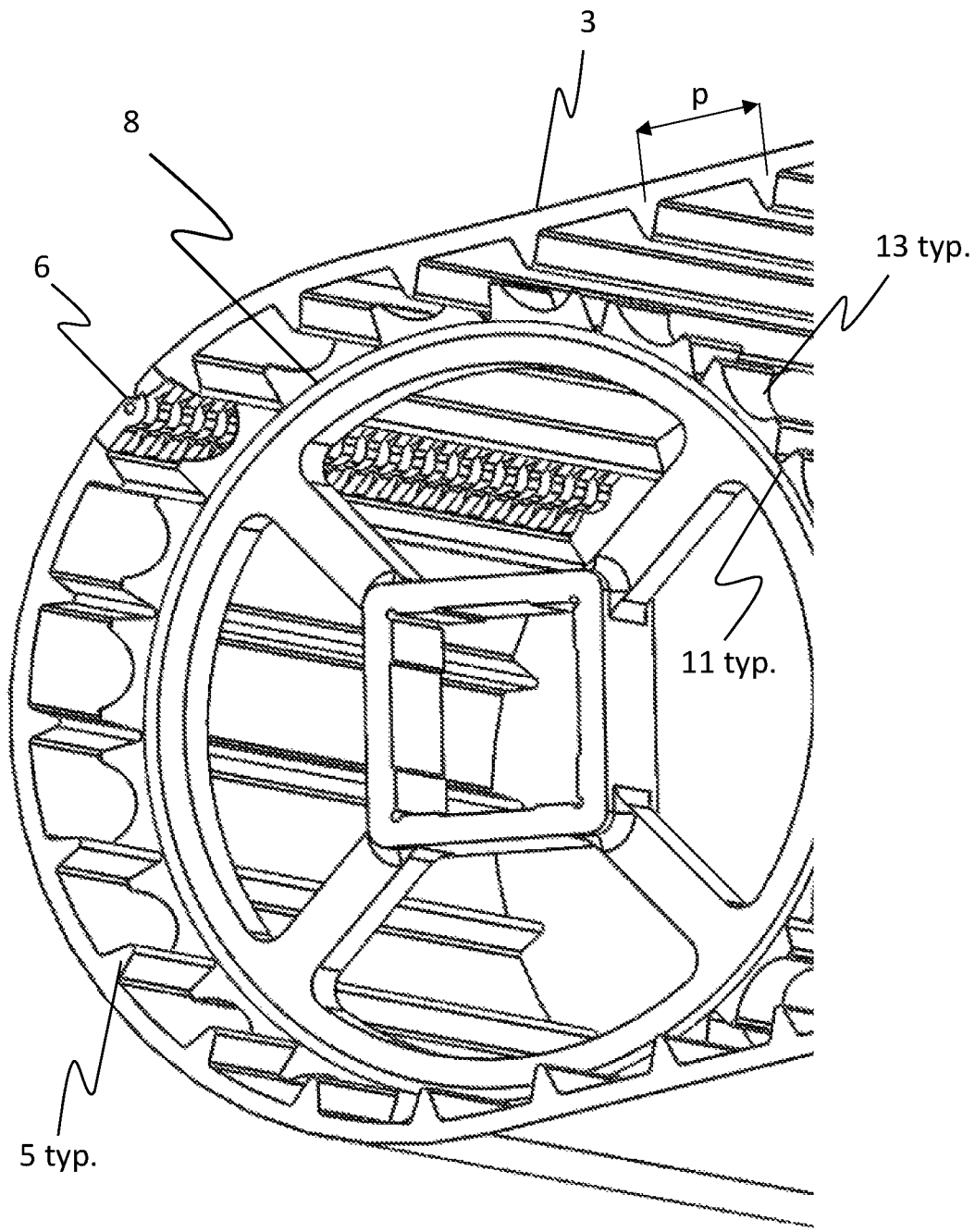
Figure 2:
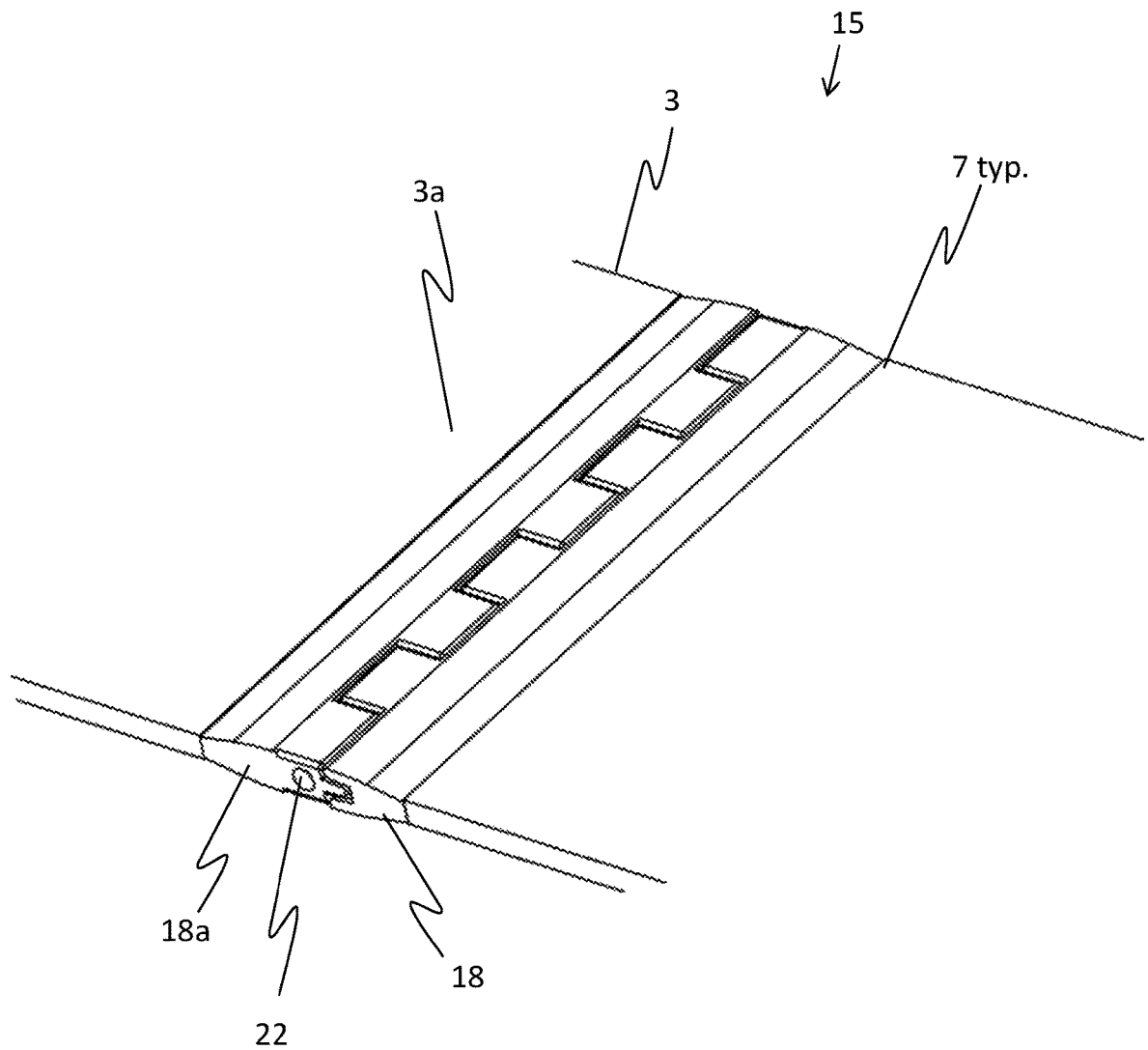
FIGS. 2 and 3 are isometric views of a lace and of a lace element, in accordance with embodiments of the current invention.
Figure 3:
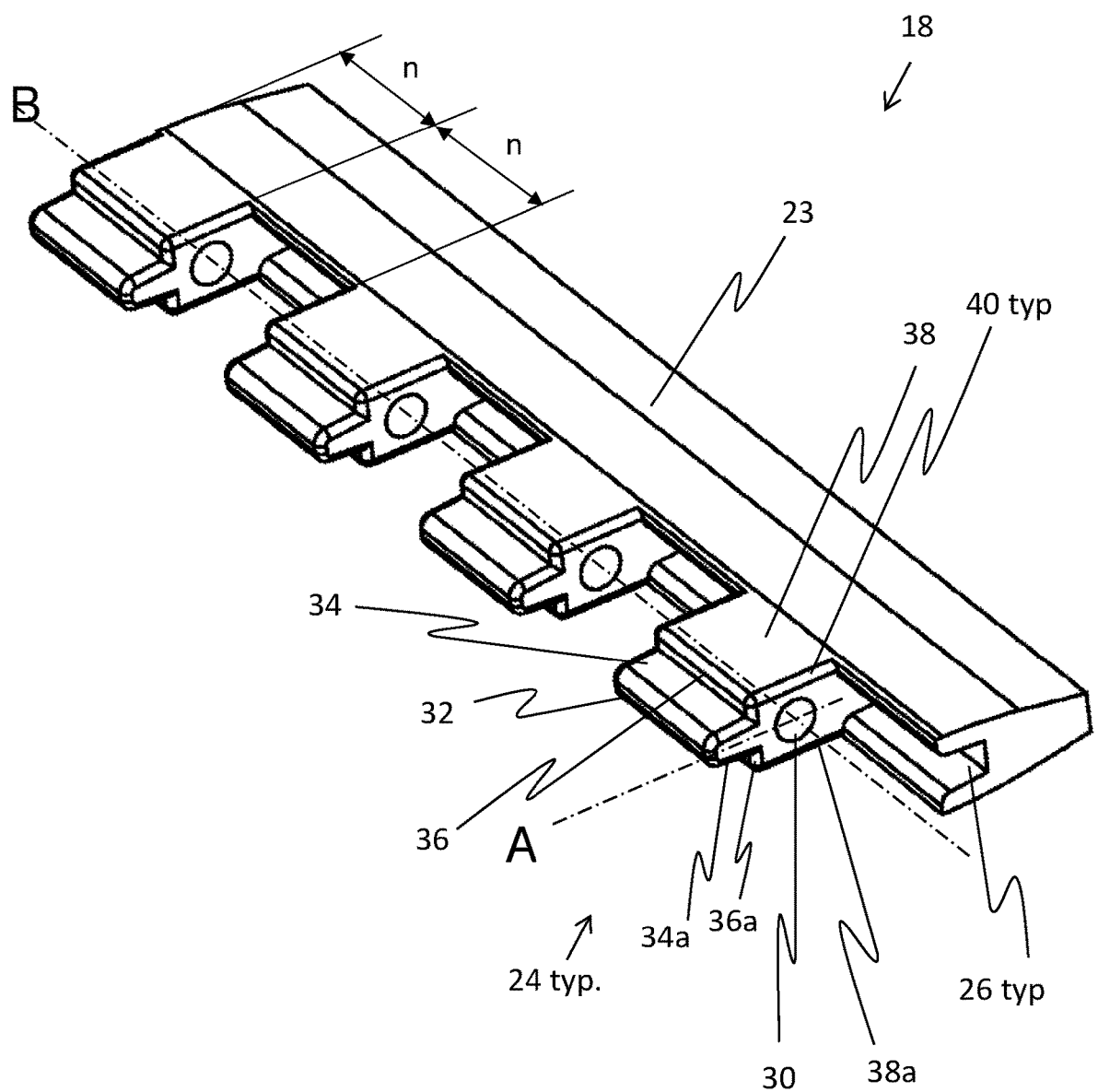

Reference is currently made to FIGS. 2 and 3, which are isometric views of a lace 15 and of a lace element 18, in accordance with embodiments of the current invention. Apart from differences described below, belt 3 and seam 7 of FIGS. 1A and 1B (hereinabove) are identical in notation, configuration, and functionality to that shown in FIGS. 2 and 3, and elements indicated by the same reference numerals and/or letters are generally identical in configuration, operation, and functionality as described hereinabove.

Lace 15 includes lace element 18, an inverted lace element 18a, and a pin 22. Lace element 18 includes: a spline 23 from which a plurality of protruding members 24 and receiving slots 26 are alternately longitudinally configured an exemplary, nominal distance "n" along spline 23. (As described further hereinbelow, exemplary, nominal distance "n" must allow for interleaving of lace elements.) Protruding member 24 is aligned along a longitudinal axis of symmetry "A" extending substantially perpendicularly from spline 23, as shown in FIG. 3, and the protruding member includes: a pin hole 30, centered on axis "A"; a leading tongue edge 32; a tongue facet 34; a base edge 36; and a base 38. Due to axis of symmetry "A", a tongue facet 34a, a base edge 36a, and a base edge 38a are configured in opposition, to tongue facet 34, base edge 36, and base edge 38, respectively—as shown in in the figure. Protruding member 24 is formed with chamfers 40, as shown in FIG. 3, on leading tongue edge 32, tongue facets 34, 34a, base edges 36, 36a, and base edges 38, 38a, respectively. Chamfers 40 enable easier integration of lace element 18 into lace 15 and functioning of lace 15 as described further hereinbelow.

The symmetric shape of protruding member 24 and the configuration of protruding member 24 and receiving slot 26 as described hereinabove, allows lace element 18 to be rotated 180 degrees about lateral axis "B"—which is coaxial with pin hole 30—to yield inverted lace element 18a. Inverted lace element 18a is offset along axis "B" and interleaved with lace element 18, along lateral axis "B" to form lace 15, as shown in FIG. 2. Pin 22 is inserted laterally into aligned, interleaved pin holes 30 to lock lace elements 18 and 18a together, while allowing them to flex, as noted hereinabove.

Figure 4:
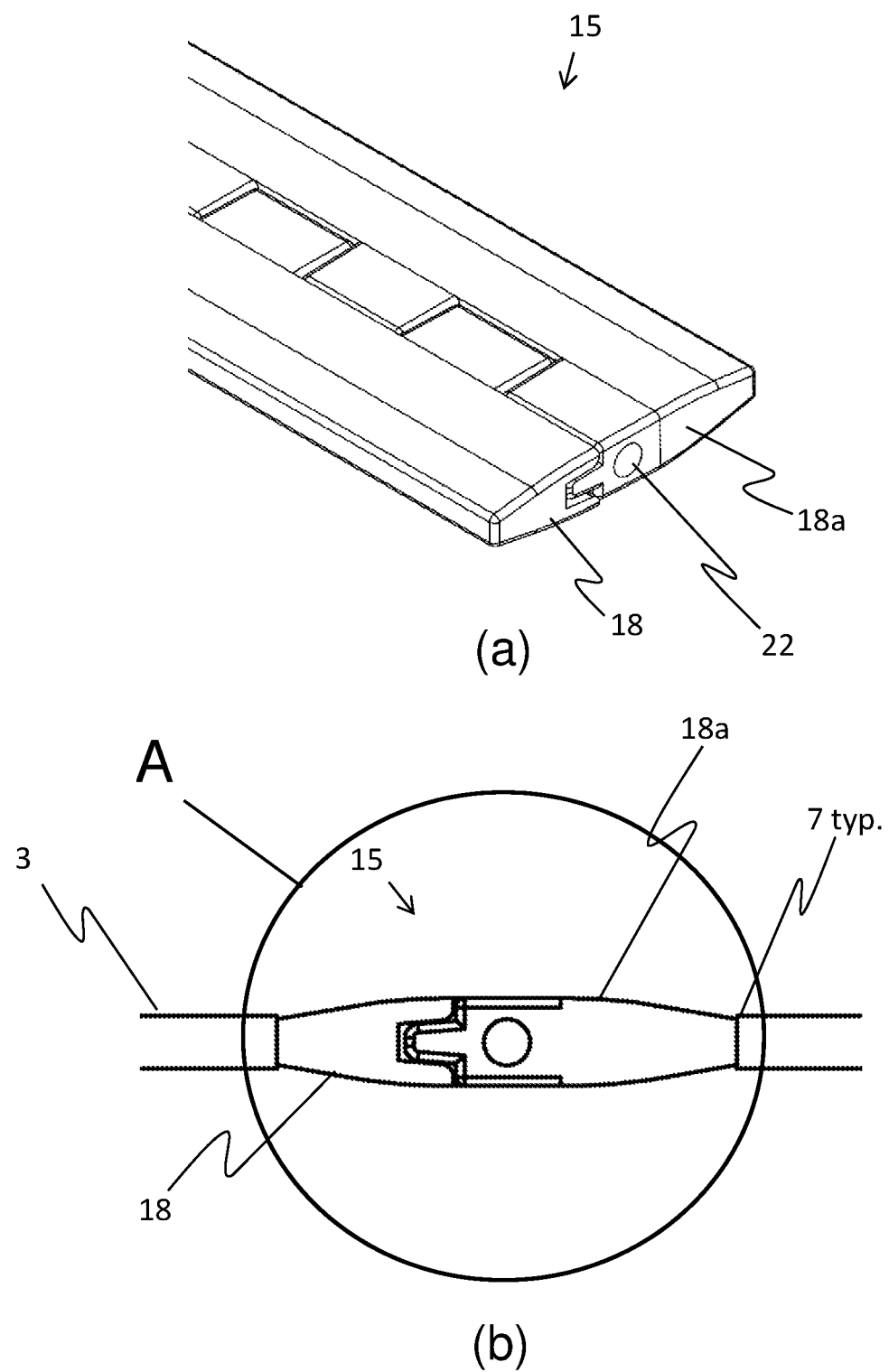
FIGS. 4 and 5 are isometric and elevational side views of the lace, in accordance with embodiments of the current invention.
Figure 5:
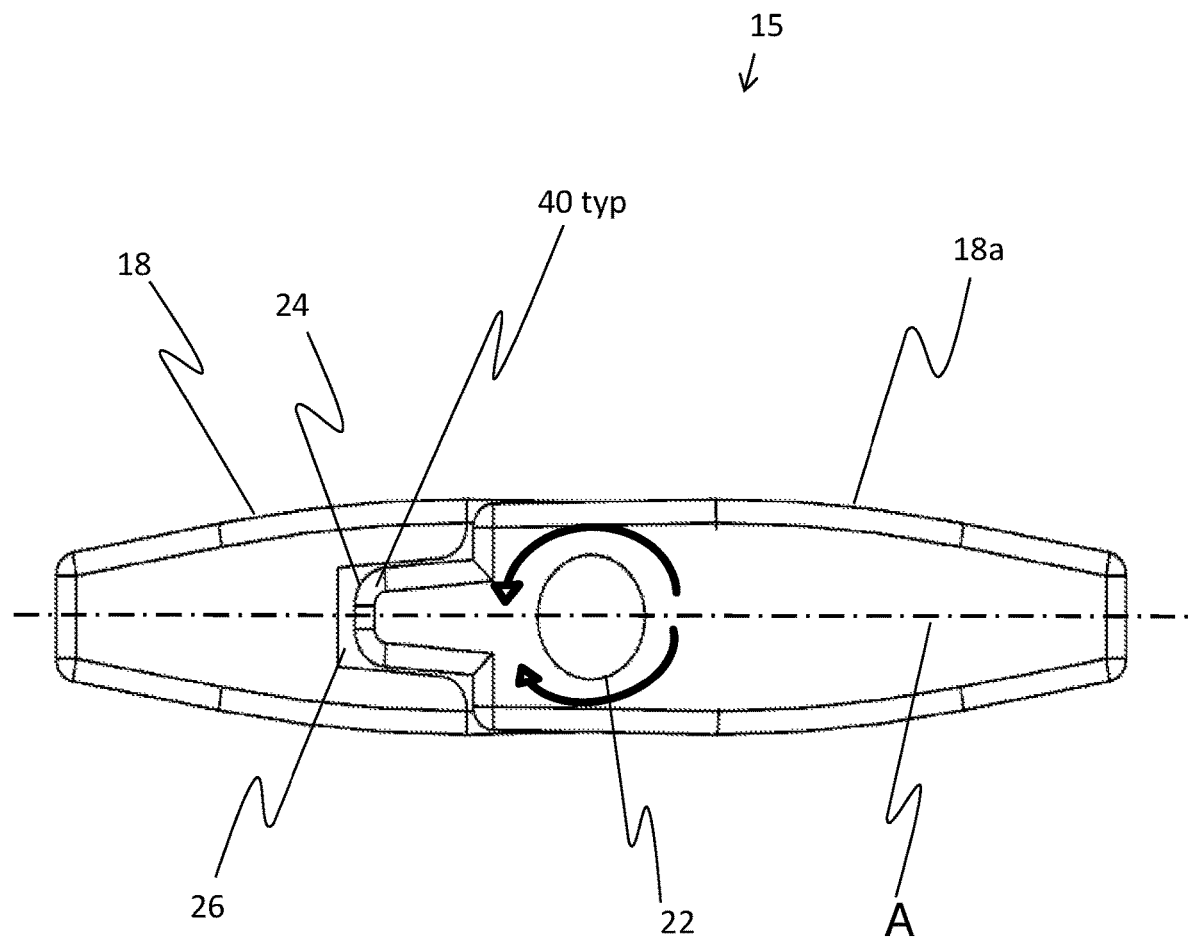

Reference is currently made to FIGS. 4 and 5, which are isometric and elevational side views of lace 15, in accordance with embodiments of the current invention. Apart from differences described below, lace 15 of FIGS. 1A, 1B, 2, and 3 (hereinabove) are identical in notation, configuration, and functionality to that shown in FIGS. 4 and 5, and elements indicated by the same reference numerals and/or letters are generally identical in configuration, operation, and functionality as described hereinabove.

In one embodiment shown in FIG. 4, view (b) lace 15 is shown connected to belt 3 at seam 7, such as by a butt weld. As noted hereinabove, lace 15 may alternatively be attached to belt 3 by different means, including being formed as part of belt 3.

Lace 15 is aligned along a longitudinal axis of symmetry "A" (ref FIG. 5), the longitudinal axis of symmetry further aligned with belt 3. Additionally, it may be seen in the figure that protruding member 24 of lace element 18a, inserted into receiving slot 26 of lace element 18 allows for limited flexing about pin 22, as indicated by the arrows. The limited flexing (as indicated by the two opposing curved arrows in the figure) allows lace 15 to exhibit flexibility, similar to that of belt 3—both terms having been discussed hereinabove with regard to the prior art.

Reference is currently made to FIGS. 6A, 6B, 7A, 7B, and 8 which are isometric views of male endless belt systems 102, 202, and 302, respectively, and corresponding side elevational views of belts 103, 203 and 303, respectively in accordance with embodiments of the current invention. Apart from differences described below, lace 15 of FIGS. 1A, 1B, and 2-5 (hereinabove) is identical in notation, configuration, and functionality to that shown in FIGS. 6A, 6B, 7A, 7B, and 8, and elements indicated by the same reference numerals and/or letters are generally identical in configuration, operation, and functionality as described hereinabove.

As opposed to the prior art female belt-sprocket configuration described in FIGS. 1A and 1B hereinabove, the endless belt systems shown in FIGS. 6A, 6B, 7A, 7B, and 8 have a male configuration, as further described hereinbelow.

Figure 6A:
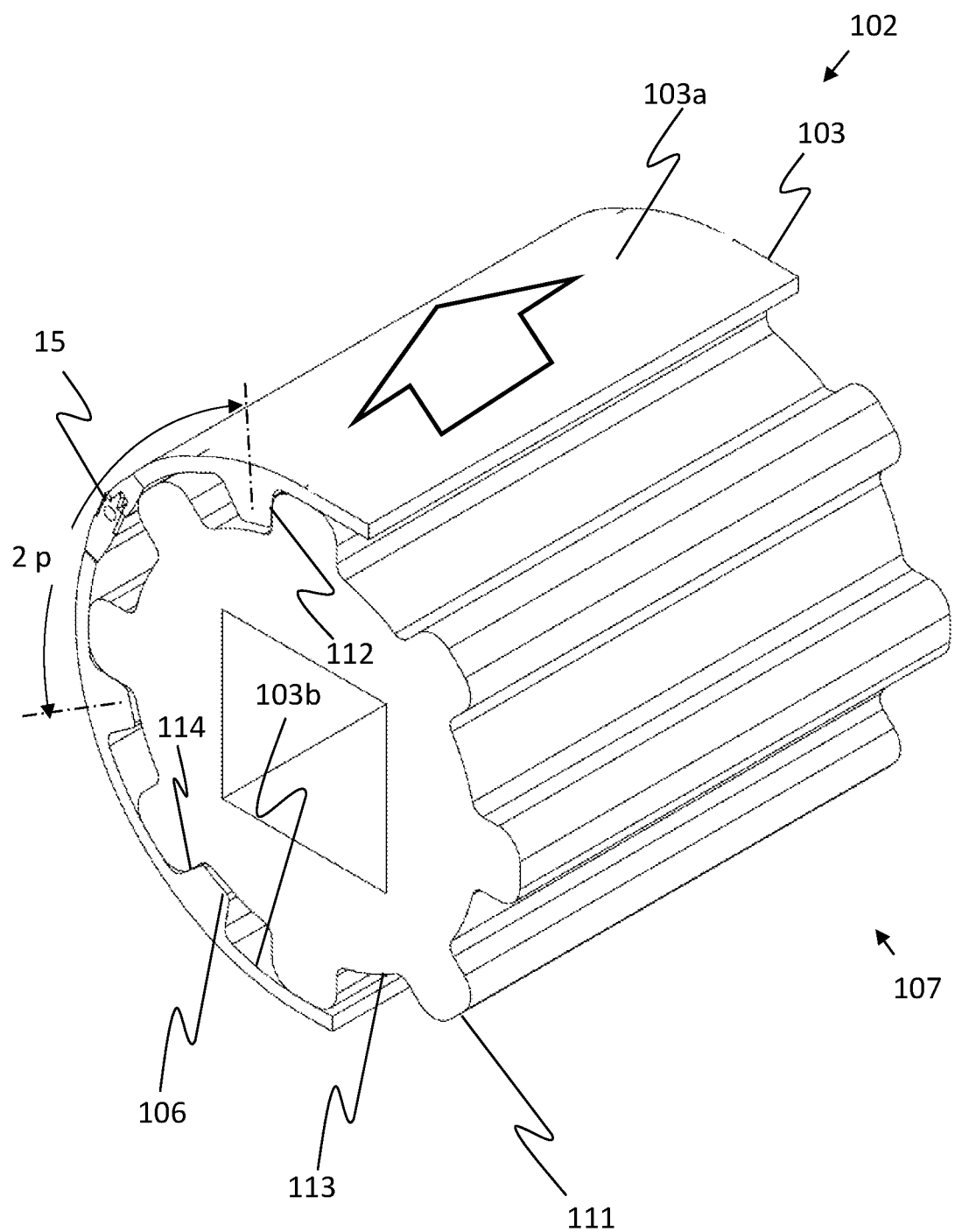
Figure 6B:
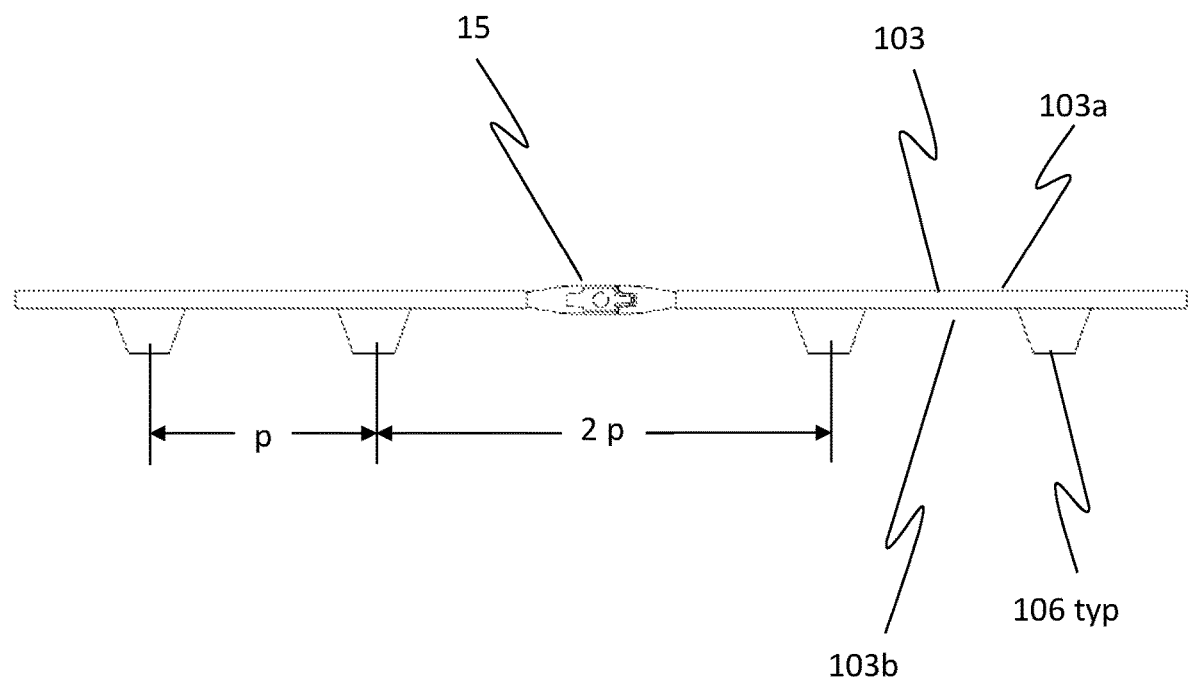

One embodiment of the current invention is shown in FIGS. 6A and 6B, with endless belt system 102 includes an endless belt 103 having an exterior surface 103a (typically a conveying surface for conveying a product) and an interior surface 103b, serving as a drive surface, which includes laterally configured drive elements, illustrated as teeth 106, extending from interior surface 103b, the teeth having an exemplary truncated, inverted "V" shaped profile, as shown in the figure. Teeth 106 are spaced longitudinally on the interior surface by a pitch value of "2p". Lace 15 is integrated into endless belt 103 as described previously hereinabove.

A sprocket drive wheel 107 (also called "sprocket") serves to drive endless belt 103 (shown partially in the figures), which is wrapped around sprocket 107, the sprocket having an axle fixed to a conveyor system frame (neither shown in the figure) and the sprocket serving to engage and drive teeth 106, thereby translating endless belt 103, in the direction shown by the arrow. Sprocket 107 has protruding drive teeth 111, arranged with an exemplary pitch no less than the pitch value of teeth 106, and arranged on the circumference of the sprocket, as shown in the figure; the teeth having a generally chamfered edge, stout-rectangular shape as shown. As opposed to the previously-described female system, where belt-teeth are inserted into sprocket tooth drive depressions, the male belt and sprocket configuration of endless belt system 102 incorporate a leading drive edge 112 of drive tooth 111 engaging a trailing driven edge 114 of drive tooth 106 to advance the belt. Embodiments of the current invention include a shape of teeth 106 different than that shown in the figure, with the only requirement for an alternate shape of teeth 106 being to allow proper driving of the belt by the sprocket, as described hereinabove.

As can be seen in FIG. 6A, lace 15 is typically located between drive teeth 111 as the belt is driven by the sprocket. Referring to FIG. 6B, it can be seen that lace 15 is incorporated into belt 103 with a pitch value of ½×2p=1p between adjoining teeth 106. Other endless belt systems having other pitch values are described hereinbelow.

Figure 7A:
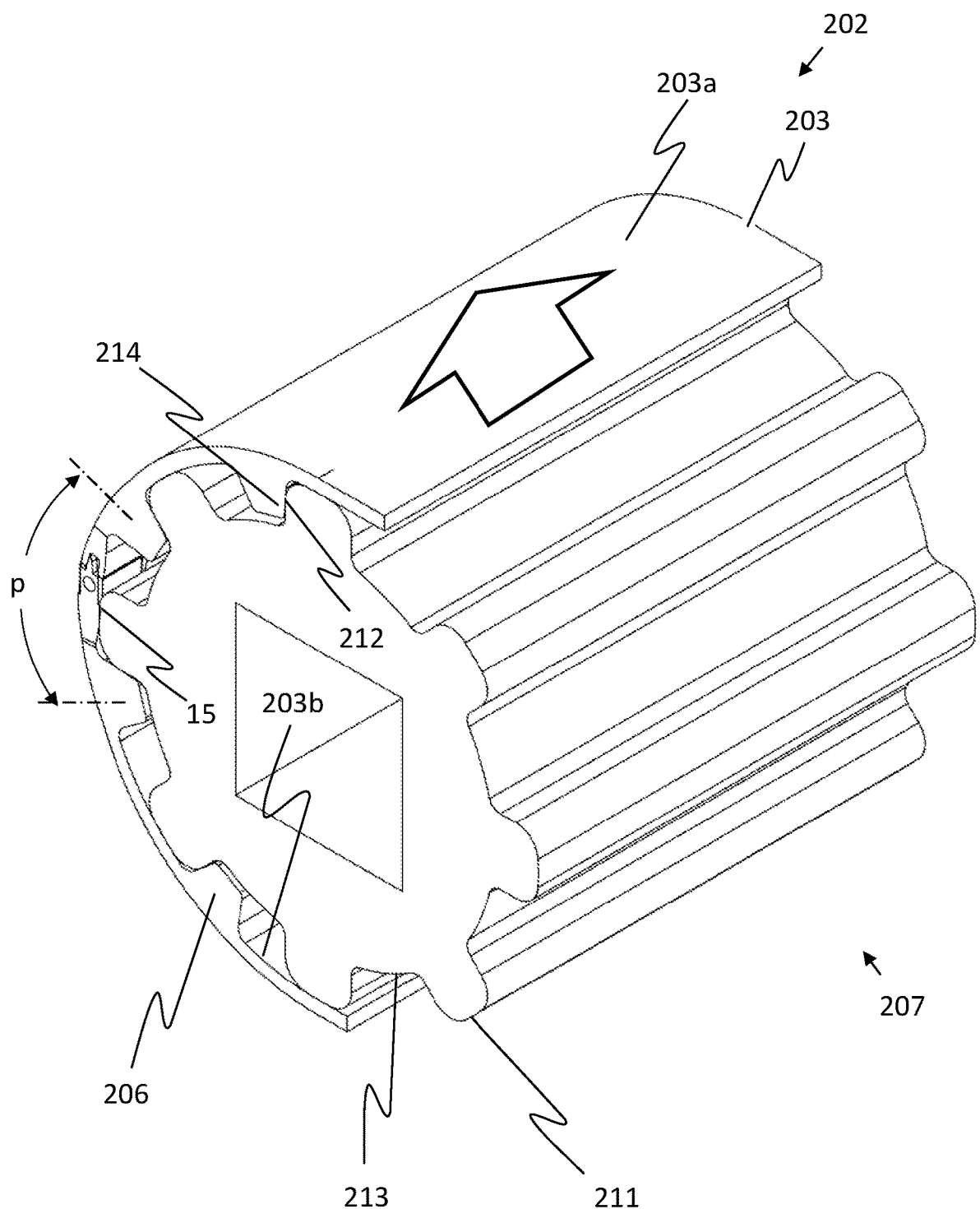
Figure 7B:
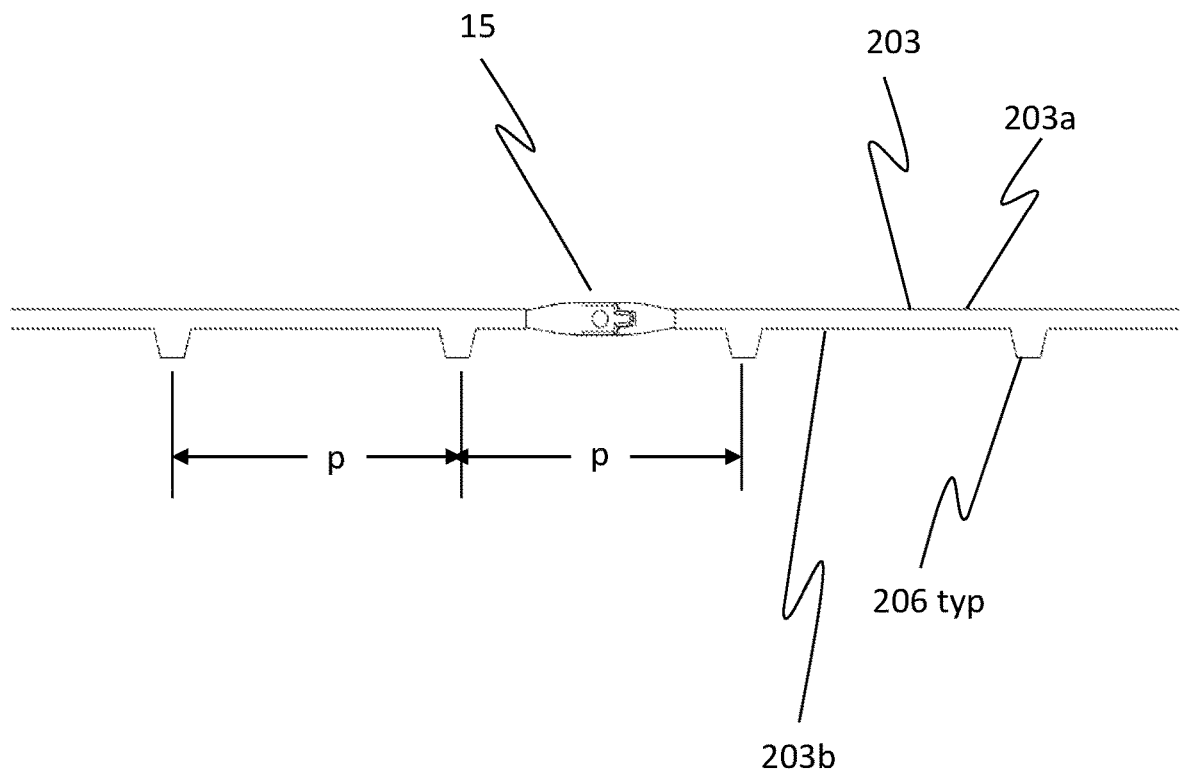

An embodiment of the current invention is shown in FIGS. 7A and 7B, where endless belt system 202 includes an endless belt 203 (shown partially in the figures), having an exterior surface 203a (typically a conveying surface for conveying a product) and an interior surface 203b, serving as a drive surface including drive elements, illustrated as teeth 206, extending from interior surface 203b, the teeth having an exemplary truncated "V" shaped profile as shown in the figure. Teeth 206 are spaced longitudinally on interior surface 203b by a pitch value of "p". Lace 15 is attached to endless belt 203 as described previously hereinabove.

A sprocket drive wheel 207 (also called "sprocket") serves to drive endless belt 203, which is wrapped around sprocket 207, the sprocket typically having an axle fixed to a conveyor system frame (neither shown in the figure) and the sprocket serving to engage and drive teeth 206, thereby translating endless belt 203, in the direction shown by the arrow. Sprocket 207 has protruding drive teeth 211, arranged with an exemplary pitch value no less than corresponding to teeth 206, and arranged on the circumference of the sprocket, as shown in the figure; the teeth having a generally chamfered edge, stout-rectangular shape as shown. The male belt and sprocket configuration of endless belt system 202 incorporate a leading drive edge 212 of drive tooth 211 engaging a trailing driven edge 214 of drive tooth 206 to advance the belt. As noted previously, embodiments of the current invention include teeth 206 having a shape different than that shown in the figure; with the constraint that any shape of teeth 206 allows for proper driving of the belt by the sprocket, as described hereinabove.

As can be seen in FIG. 7A, lace 15 typically rides over drive teeth 211 and the lace does not interfere with other drive teeth 211 as the belt is driven by the sprocket. Referring to FIG. 7B, it can be seen that lace 15 is incorporated into belt 203 with a pitch value of ½×p=½ p between adjoining teeth 206.

Figure 8:
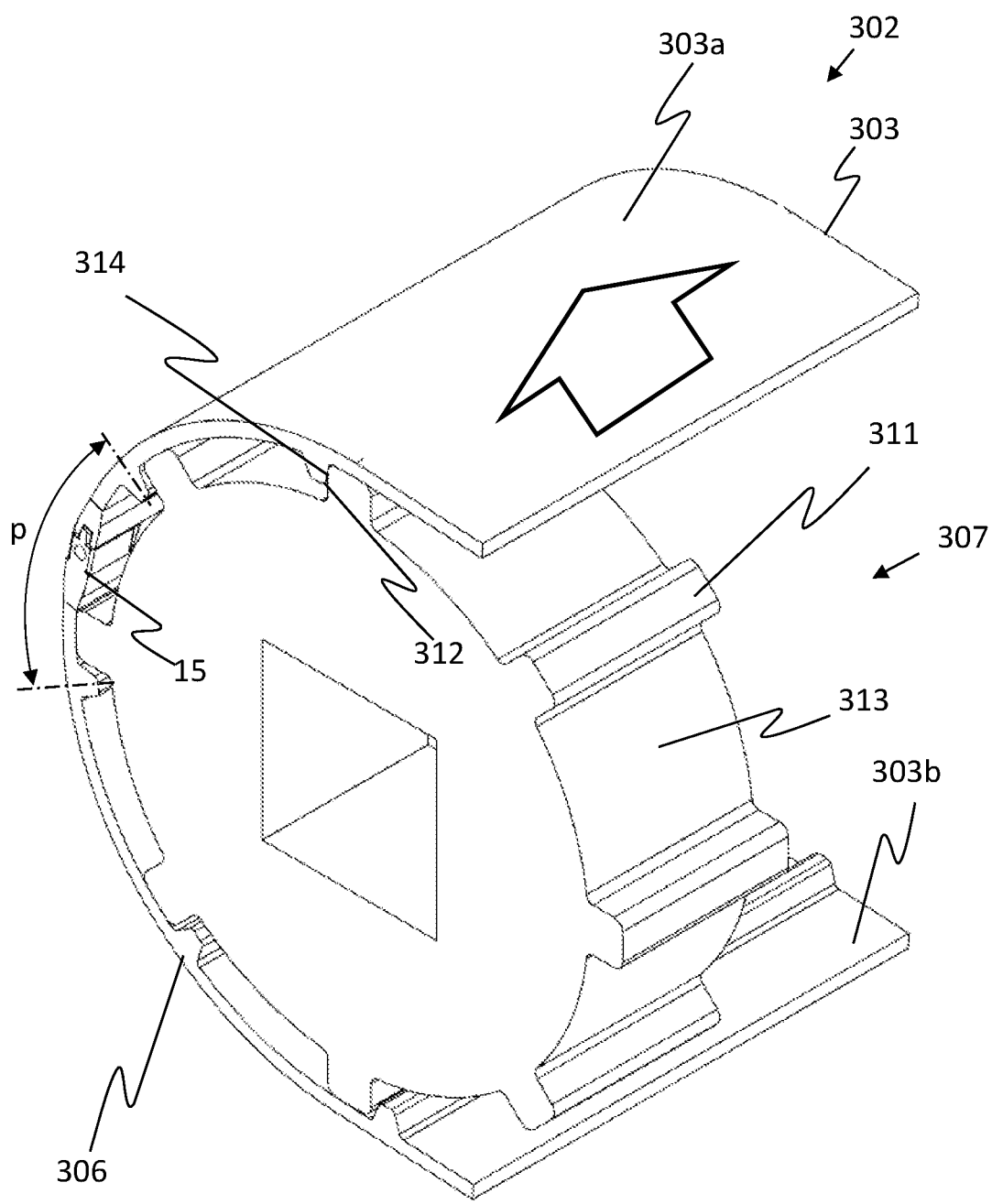

Another embodiment of the current invention is shown in FIG. 8, where endless belt system 302 includes an endless belt 303 (shown partially in the figure), having an exterior surface 303a (typically a conveying surface for conveying a product) and an interior surface 303b, serving as a drive surface including drive elements, illustrated as teeth 306, extending from interior surface 303b, the teeth having an exemplary truncated "V" shaped profile as shown in the figure. Teeth 306 are spaced longitudinally on the interior surface by a pitch value of "p", as shown. Lace 15 is attached to endless belt 303 as described previously hereinabove.

A sprocket drive wheel 307 (also called "sprocket") serves to drive endless belt 303, which is wrapped around sprocket 307, the sprocket typically having an axle fixed to a conveyor system frame (neither shown in the figure) and the sprocket serving to engage and drive teeth 306, thereby translating endless belt 303, in the direction shown by the arrow. Sprocket 307 has protruding drive teeth 311, arranged with a matching pitch value to that of teeth 306, on the circumference of the sprocket, as shown in the figure, the teeth having a generally chamfered edge, stout-rectangular shape as shown. The male belt and sprocket configuration of endless belt system 302 incorporates a leading drive edge 312 of drive tooth 311 engaging a trailing driven edge 314 of drive tooth 306 to advance the belt. As noted previously, embodiments of the current invention include teeth 306 having a shape different than that shown in the figure; with the constraint that any shape of teeth 306 allows for proper driving of the belt by the sprocket, as described hereinabove.

As can be seen in FIG. 8, lace 15 is typically located between drive teeth 311 and the lace does not interfere with drive tooth 311 as the belt is driven by the sprocket. It can be seen that lace 15 is incorporated into belt 303 with a pitch value of ½×p=½ p between adjoining teeth 306.

In addition to the embodiments described hereinabove, additional pitch values and different lace spacing/positioning may be incorporated in other embodiments of the current invention.

The male configuration of belt-sprocket-lace embodiments described hereinabove has advantages over a female configuration, such as, but not limited to:
 belt-versus-sprocket tooth pitch tolerances may be larger;
 belt tension and belt movement relative to the sprocket—both present in typical conveyor belt operations—may more easily be controlled; and
 sprocket and belt surfaces have simpler geometries and are generally easier to clean.

Embodiments of the current invention my incorporate belts and sprockets not having drive teeth. Reference is currently made to FIG. 9, which is an isometric view of an endless belt system 402 including an endless belt 403 (shown partially in the figure) having an exterior surface 403a (typically a conveying surface for conveying a product) and an interior surface 403b not having any drive elements, in accordance with embodiments of the current invention. While interior surface 403b may have enhanced friction characteristics, such as, but not limited to surface treatment, the interior surface is described as "smooth", meaning not having teeth and/or drive elements. Lace 15 is attached to endless belt 403 as described previously hereinabove.

A sprocket drive wheel 407 (also called "pulley) serves to drive endless belt 403, which is wrapped around pulley 407, the pulley typically having an axle fixed to a conveyor system frame (neither shown in the figure). In present endless belt system 402 the pulley serves to drive and advance the endless belt without any drive teeth, as known in the art.

As can be seen in FIG. 9, lace 15 lies substantially flat on the pulley, the lace exhibiting limited flexing, as described hereinabove in FIG. 5 and as shown in FIGS. 6A, 6B, 7A, 7B, and 8.

Reference is currently made to FIGS. 10, 11, and 12, which are an isometric view of a lace 515, a detailed isometric view of a lace element 518, and a detailed side view of lace 515, in accordance with embodiments of the current invention. Lace 515 includes lace element 518, an inverted lace element 518a, and a pin 522. In one embodiment shown in FIG. 10, lace 515 is shown connected to belt 503 at seam 507, such as, but not limited to by a butt weld. As noted previously hereinabove, lace 515 may alternatively be attached to belt 503 by different means, including being formed as part of belt 503. Belt 503 has an exterior surface 503a (typically a conveying surface for conveying a product) and an interior surface 503b (not visible in the figure but schematically identified) serving as a drive/bearing surface, as further described hereinbelow.

Lace element 518 includes: a spline 523 from which a plurality of protruding members 524 and receiving slots 526 are alternately configured an exemplary, nominal distance "m" along spline 523. (As described further hereinbelow, exemplary, nominal distance "m" must allow for interleaving of lace elements.) Protruding member 524 is aligned along an axis of symmetry "C" extending substantially perpendicularly from spline 523, as shown in FIG. 11, and the protruding member includes: a pin hole 530, centered on axis "C"; a leading tongue edge 532; a tongue facet 534; a base edge 536; and a base 538. Due to axis of symmetry "C", a tongue facet 534a, a base edge 536a, and a base edge 358a are configured in opposition, to tongue facet 534, base edge 536, and base edge 538, respectively—as shown in in the figure. Protruding member 524 is formed with chamfers 540, as shown in FIGS. 11 and 12, and specifically on leading tongue edge 532, tongue facets 534, 534a, base edges 536, 536a, and base edges 538, 538a, respectively. Chamfers 540 enable easier integration of lace element 518 into lace 515 and functioning of lace 515 as described further hereinbelow. Spline 523 has a flat lower surface 527 and an arcuate upper surface 528.

The symmetric shape of protruding member 524 and the configuration of protruding member 524 and receiving slot 526 as described hereinabove, allows lace element 518 to be rotated 180 degrees about vertical axis "D"—which is perpendicular to protruding member 524 and to flat lower surface 527—to yield an opposing lace element 518a. Lace element 518a is offset along axis "E"—which is coaxial with pin holes 530—and then lace element 518a is interleaved with lace element 18, along longitudinal axis "E" to form lace 515, as shown in FIG. 10. Pin 522 is inserted into aligned, interleaved pin holes 530 to lock lace elements 518 and 518a together, while allowing them to flex, as described hereinabove.

In FIG. 12, it is seen that lace 515 is aligned along axis of symmetry "C" (as described hereinabove in FIG. 11) and axis "C" is parallel to flat lower surface 527. Axis "C" is offset to surface 527 by a distance "O". It may be seen in the figure that protruding member 524 of lace element 518a, inserted into receiving slot 526 of lace element 518 allows for limited flexing about pin 522, as indicated by the arrows. The limited flexing allows lace 515 to exhibit flexibility, similar to that of belt 503, while serving to inhibit and/or prevent both tenting and back-flex of the lace—both terms having been discussed hereinabove with regard to embodiments of the current invention and with regard to the prior art. As is further discussed below, the limited flexing is further inhibited in the direction of flat lower surface 527 by contact of the flat lower surface with a sprocket.

Reference is currently made to FIGS. 13 and 14, which are elevational views of lace 515 in various configurations with belts 503, 603, and 703, in accordance with embodiments of the current invention. Apart from differences described below, lace 515 and belt 503 of FIGS. 10-12 (hereinabove) are identical in notation, configuration, and functionality to that shown in FIG. 13 and elements indicated by the same reference numerals and/or letters are generally identical in configuration, operation, and functionality as described hereinabove.

In FIG. 13, views (a) and (b) show lace 515 attached to belt 503 at seams 507 in two exemplary orientations, namely: (a) with flat lower surface 527 configured substantially flush with interior surface 503b and lace 515 extending above exterior surface 503a, and: (b) with flat lower surface 527 configured substantially flush with exterior surface 503a and lace 515 extending beneath interior surface 503b. Whereas the orientation show in view (a) is typically useful to take advantage of the flat lower surface of lace 515, for example, as the belt is in contact with a sprocket (as shown/discussed below), view (b) shows an orientation having the flat lower surface of lace 515 having an advantage, for example, in that a belt scraper—as known in the art—may be employed to ensure cleanliness of interior surface 503b, while having minimal impact upon lace 515.

In FIG. 14, views (a) and (b) show the lace attached to the belt in two exemplary orientations, similar those shown in FIG. 13—however in FIG. 14 view (a), belt 603 is thinner than belt 503 shown in FIG. 13. Belt 603 has an external surface 603a and an interior surface 603b and lace 515 is attached to belt 603 at seams 507 with flat lower surface 527 configured substantially flush with interior surface 603b and lace 515 extending above exterior surface 603a.

In view (b) of FIG. 14 belt 703 is thicker than belt 503 shown in FIG. 13. Belt 703 has an external surface 703a and an interior surface 703b and lace 515 is attached to belt 703 at seams 507 with flat lower surface 527 configured substantially flush with exterior surface 703a and lace 515 extending beneath interior surface 703b. The advantages of respective exemplary orientations described hereinabove regarding FIG. 13 are likewise applicable to the exemplary orientations described in FIG. 14.

Reference is currently made to FIG. 15 which is an isometric view of an endless belt system 502 including an endless belt 503 (shown partially in the figure) having an exterior surface 503a (typically a conveying surface for conveying a product) and an interior surface 503b not having any drive elements, in accordance with embodiments of the current invention. Endless belt system 502 is similar to the endless belt system shown in FIG. 9, in that the interior surface may have enhanced friction characteristics, such as but not limited to surface treatments, the interior surface is described as "smooth", meaning not having teeth and/or drive elements. Lace 515 is attached to endless belt 503 as described previously in FIGS. 10, 13, and 14 hereinabove.

Similar to the system shown in FIG. 9, a sprocket drive wheel 507 (also called "pulley") serves to drive endless belt 503, which is wrapped around sprocket 507, the sprocket typically having an axle fixed to a conveyor system frame (neither shown in the figure). In present endless belt system 502 the sprocket serves to drive and advance the endless belt without any drive teeth, as known in the art.

As can be seen in FIG. 15, the lower flat surface of lace 515 allow the lace to be configured substantially flat on the sprocket, as described hereinabove in FIG. 12 and as shown in FIGS. 13, view (a) and 14 view (a).

In similar fashion—not shown in the current figure—the lower flat surface of lace 515 may be oriented as shown in FIGS. 13, view (b) and 14 view (b), thereby allowing the lace to be configured substantially flush with the exterior surface of lace 513 and thereby providing a continuous surface to allow easier cleaning, as noted previously.

Additionally, in reference to FIGS. 6B, 7B, 10, 13-15, the exterior surface of the endless belt may include cleats (not shown in the figures), the cleats being similar to teeth typically configured on the interior surface of the endless belt, as known in the art. Embodiments of the current invention include the lace being integrated with a cleat configuration, mutatis mutandis.

It will be appreciated that the above descriptions are intended only to serve as examples, and that many other embodiments are possible within the scope of the present invention as defined in the appended claims.

The invention claimed is:

1. A conveyor belt fastening system for an endless belt formed by joining a first and a second end of a conveyor belt together, the system comprising:
   a lace connected to the first and second ends of the conveyor belt, the endless belt having an exterior and an interior surface;
   at least one drive sprocket and at least one return roller about which the interior surface of the endless belt is peripherally wrapped, the at least one drive sprocket configured to translate the endless belt;
   wherein the lace has a symmetric configuration about a longitudinal axis of symmetry, the longitudinal axis aligned longitudinally and parallel to the endless belt, between the exterior and interior surfaces of the endless belt.

2. The fastening system of claim 1, wherein the lace includes a first and a second lace element, each lace element having a plurality of alternatingly configured protruding members and receiving slots, each protruding member extending longitudinally from a spline and along the longitudinal axis of symmetry and each protruding member having a pin hole centered on the longitudinal axis and coaxially aligned with a lateral axis configured parallel to the spline.

3. The fastening system of claim 2, wherein the first and second lace elements are interleaved, with respective alternating protruding members and receiving slots and respective pin holes in alignment, a pin inserted into aligned pin holes.

4. The fastening system of claim 3, wherein the pin serves to lock the first and second elements together and to allow limited flexing of the lace about the pin.

5. The fastening system of claim 4, wherein the limited flexing serves to inhibit and prevent tenting and back-flex of the lace.

6. The fastening system of claim 5, wherein a plurality of drive elements are configured laterally on and extending from the interior surface of the endless belt, the plurality of drive elements longitudinally spaced by a belt-pitch spacing, the lace integrated between individual drive elements by a value chosen from the list including: one-half belt pitch and one belt pitch.

7. The fastening system of claim 6, wherein the at least one drive sprocket has protruding drive teeth configured on the circumference of the at least one drive sprocket, the drive teeth having a sprocket-pitch value no less than the belt-pitch value and the lace not interfering with drive teeth.

8. The fastening system of claim 7, wherein the belt-sprocket-lace configuration is male.

9. The fastening system of claim 5, wherein the interior surface of the endless belt is smooth and not having drive elements and the drive sprocket is a pulley, the pulley having a circumference and with the lace lying substantially flat on the circumference of the pulley as the belt is translated by the pulley.

10. A conveyor belt fastening system for an endless belt formed by joining a first and a second end of a conveyor belt together, the system comprising:
    a lace connected to the first and second ends of the conveyor belt, the endless belt having an exterior and an interior surface;
    at least one drive sprocket and at least one return roller about which the interior surface of the endless belt is peripherally wrapped, the at least one drive sprocket configured to translate the endless belt;
    wherein the lace has a symmetric configuration about a longitudinal axis of internal symmetry, the longitudinal axis aligned parallel with the exterior and interior surfaces of the endless belt, the lace having an arcuate upper surface and a flat lower surface offset from the longitudinal axis.

11. The fastening system of claim 10, wherein the lace includes a first and a second lace element, each lace element having a plurality of alternatingly configured protruding members and receiving slots, each protruding member extending longitudinally from a spline and along the longitudinal axis of internal symmetry and each protruding member having a pin hole centered on the longitudinal axis of internal symmetry and coaxially aligned with a lateral axis configured parallel to the spline.

12. The fastening system of claim 11, wherein the first and second lace elements are interleaved, with respective alternating protruding members and receiving slots and respective pin holes in alignment, a pin inserted into aligned pin holes.

13. The fastening system of claim 12, wherein the pin serves to lock the first and second elements together and to allow limited flexing of the lace about the pin.

14. A method of forming an endless belt by joining a first and a second end of a conveyor belt together, the method comprising the steps of:
    connecting a lace to the first and second ends of the conveyor belt, the endless belt having an exterior and an interior surface;
    peripherally wrapping the interior surface of the endless belt about at least one drive sprocket and at least one return roller, the at least one drive sprocket translating the endless belt;
    whereby the lace is symmetrically configured about a longitudinal axis of symmetry, the longitudinal axis aligned longitudinally and parallel to the endless belt, between the exterior and interior surfaces of the endless belt.

15. The method of claim 14, whereby the lace includes a first and a second lace element, each lace element having a plurality of alternatingly configured protruding members and receiving slots, each protruding member extending longitudinally from a spline and along the longitudinal axis of symmetry and each protruding member having a pin hole centered on the longitudinal axis and coaxially aligned with a lateral axis configured parallel to the spline.

16. The method of claim 15, whereby the first and second lace elements are interleaved, with respective alternating protruding members and receiving slots and respective pin holes in alignment, a pin inserted into aligned pin holes.

* * * * *